United States Patent
Henson et al.

(10) Patent No.: US 7,207,263 B2
(45) Date of Patent: *Apr. 24, 2007

(54) SINGLE MOLD FORM FRYER WITH PRODUCT CENTERING ELEMENTS

(75) Inventors: William Douglas Henson, Duncanville, TX (US); Harold Reed McKay, Jr., Plano, TX (US); Donald Joe Tatsch, Tioga, TX (US)

(73) Assignee: Frito-Lay North America, Inc., Plano, TX (US)

( * ) Notice: Subject to any disclaimer, the term of this patent is extended or adjusted under 35 U.S.C. 154(b) by 270 days.

This patent is subject to a terminal disclaimer.

(21) Appl. No.: 10/918,281

(22) Filed: Aug. 13, 2004

(65) Prior Publication Data

US 2005/0019463 A1  Jan. 27, 2005

Related U.S. Application Data

(63) Continuation-in-part of application No. 10/347,993, filed on Jan. 21, 2003, now Pat. No. 6,875,458.

(51) Int. Cl.
*A47J 37/12* (2006.01)
*A23L 1/01* (2006.01)

(52) U.S. Cl. .............................. 99/405; 99/406; 99/407; 99/427; 99/443 C; 99/353

(58) Field of Classification Search .................. 99/404, 99/405, 406, 407, 427, 353, 432, 439, 443 C
See application file for complete search history.

(56) References Cited

U.S. PATENT DOCUMENTS

| 31,819 | A | | 3/1861 | Moore |
|---|---|---|---|---|
| 3,294,545 | A | | 12/1966 | Cunningham et al. |
| 3,520,248 | A | * | 7/1970 | MacKendrick ............... 99/353 |
| 3,576,647 | A | | 4/1971 | Liepa |
| 3,736,862 | A | | 6/1973 | Crommelijnck |
| 3,905,285 | A | | 9/1975 | Campbell et al. |
| 3,935,322 | A | | 1/1976 | Weiss et al. |
| 4,530,275 | A | * | 7/1985 | Stickle et al. ................. 99/353 |
| 5,562,010 | A | | 10/1996 | McGuire |
| 6,129,939 | A | * | 10/2000 | Fink et al. ................... 426/438 |
| 6,403,135 | B1 | | 6/2002 | Graham et al. |

(Continued)

FOREIGN PATENT DOCUMENTS

WO    PCT/US99/03190    8/1999

*Primary Examiner*—Reginald L. Alexander
(74) *Attorney, Agent, or Firm*—Carstens & Cahoon, LLP; Colin P. Cahoon; William S. Wang

(57) ABSTRACT

A mold form fryer utilizing a top conveyor that transports snack pieces through a constant velocity oil stream without the need of a bottom mating mold or conveyor. Herein, the form fryer is provided with a top conveyor disposed above a fryer oil pan positioned longitudinally through the fryer. Uncooked snack pieces are provided to the fryer oil pan by a bottom entrance conveyor. Snack pieces, once in oil within the fryer, meet with a top conveyor having convex molding surfaces with product-centering elements. At the exit portion of the fryer, a bottom exit conveyor receives the cooked snack pieces from the top conveyor. As no continuous bottom conveyor is utilized, the fryer oil pan may be provided with a reduced volume segment situated between the bottom entrance and exit conveyors.

3 Claims, 15 Drawing Sheets

U.S. PATENT DOCUMENTS 6,412,397 B1  7/2002  McNeel et al.
6,412,399 B1  7/2002  Graham et al.
6,875,458 B2 *  4/2005  Dove et al. ................. 426/438

* cited by examiner

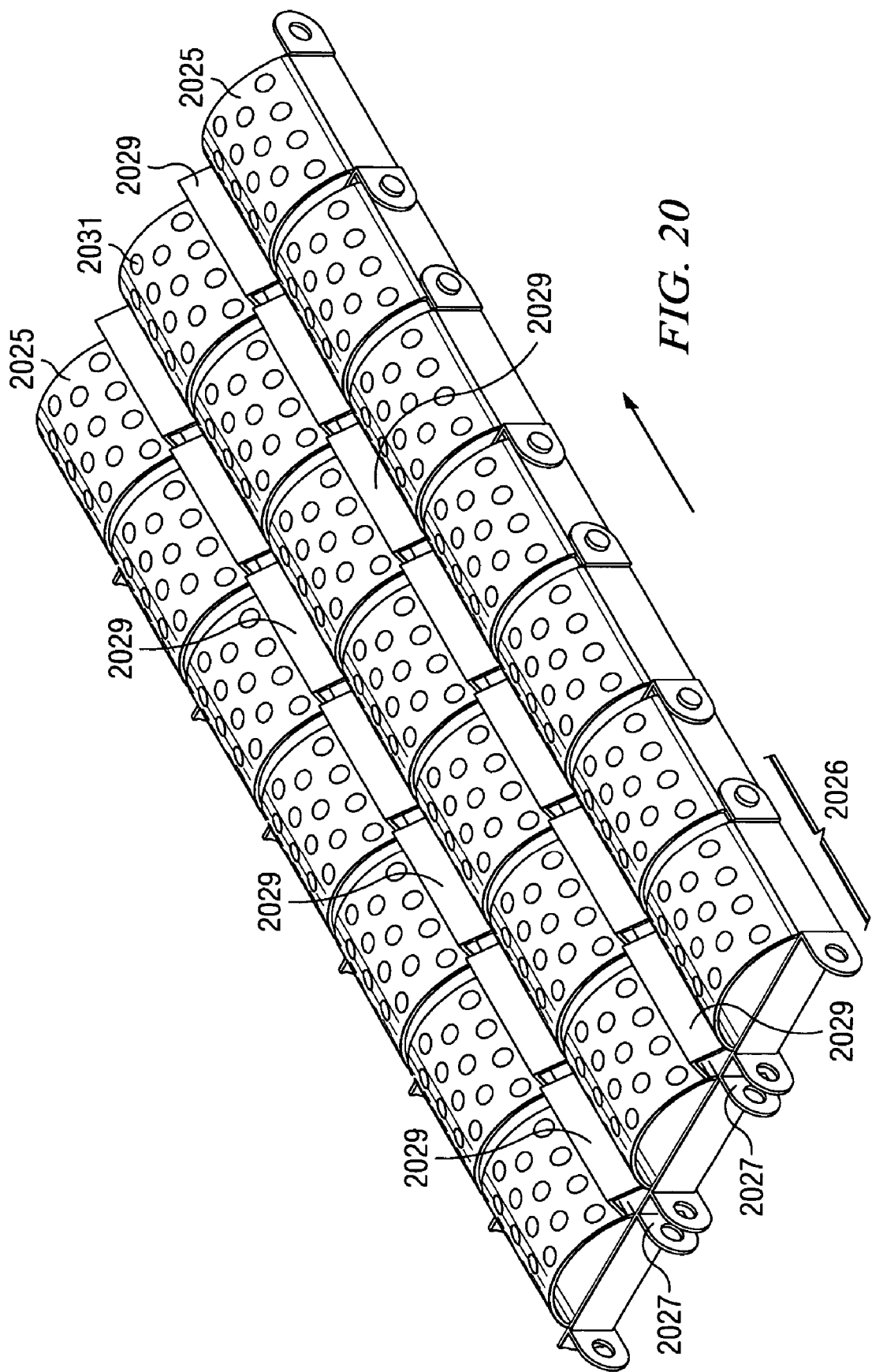

SINGLE MOLD FORM FRYER WITH PRODUCT CENTERING ELEMENTS

CROSS-REFERENCE TO RELATED APPLICATION

This application is a continuation-in-part of U.S. application Ser. No. 10/347,993 entitled "Single Mold Form Fryer With Enhanced Product Control" and filed on Jan. 21, 2003 now U.S. Pat. No. 6,875,458.

BACKGROUND OF THE INVENTION

1. Technical Field

The present invention relates to a fryer assembly for the fabrication of snack food. More particularly, the invention relates to a form fryer assembly for the fabrication of snack food where product inlet and outlet conveyors replace a continuous lower conveyor, and further wherein product-centering elements disposed between individual mold segments keep frying product centered upon mold segments during frying.

2. Description of Related Art

Snack pieces are known to be prepared with the use of fryers. Generally, snack pieces such as fabricated potato crisps are formed from dough and are sheeted and cut into discrete pieces (pre-forms) for treatment. Treatment involves cooking the pre-forms in a fryer to produce cooked snack pieces. There are several types of prior art fryers typically used in the snack food industry for frying snack food products that require relatively even frying on all sides of the product. In general, these fryers cook product as it passes through in a stream of hot oil.

Particularly with potato crisps, a form fryer is beneficial because pre-forms can be molded and cooked into a desired product shape. A form fryer is a fryer for producing snack pieces having generally two conveyors, an upper and a lower conveyor. On each conveyor are molds or surfaces designed to interact with the opposing conveyor's molds or surfaces. After pre-forms are placed in the fryer, the top mold or contact surface keeps the now cooking pre-form beneath the surface of the oil until the fryer exit.

FIG. 1 shows an example of a prior art form fryer. The fryer assembly 10 has a fryer housing 12 that contains conveyors for moving pre-forms therethrough. To maintain desired environmental conditions within the housing 12, steam or inert gas may be circulated through portions above and around oil within the fryer and is supplied through a port 14, although additional ports may be added as needed. A top belt 20 is disposed in a top portion of the fryer housing 12 and is supported and rotated by two rollers 22, 24. A bottom belt 30 is disposed beneath the top belt 20. The bottom belt 30 is a continuous loop belt and is supported and rotated by two rollers 32, 34. A fryer pan 50 containing a body of oil 52 is situated within the fryer housing 12 so that at least a portion of the top and bottom belts 20, 30, when adjacent to each other, are passed through the oil 52. Oil 52 is circulated through a fryer pan 50 from an oil inlet 54 to an oil outlet 56 by, for example, a pump (not shown). Oil may be maintained at a desired cooking temperature with steam that is jacketed around the fryer pan 50.

For cooking, pre-forms are led towards the fryer by the bottom belt 30 starting at about the input-side roller 32. The pre-forms are then followed from above by the top belt 20 and led towards a point in the oil 52 where the bottom belt 30 comes into close proximity with the top belt 20. By at least this point, the pre-forms have made contact with at least one mold surface. While not depicted, molds are commonly placed on at least the exterior surface of the top belt 20 but may also be placed on the exterior surface of the bottom belt 30. Once the pre-forms are secured between the top and bottom belts 20, 30, which run substantially parallel to each other through the oil 52, they are introduced to the hot cooking oil 52 at an oil entry point 53. The pre-forms thereafter travel through the hot oil 52 in the oil pan 50 completely submerged until they emerge from the oil 52 at an oil exit point 55. A typical form fryer may be operated with an oil frying temperature between 240 to 400° F., although it is preferably operated between 320 to 380° F. Thereafter, the cooked snack pieces are transferred by the oil and conducted along the exit portion of the bottom belt 30 and are transferred to the next segment of the overall process at about the output-side roller 34 for seasoning, if desired, and packaging.

By using a form fryer such as the prior art example fryer assembly 10, snack foods, such as potato crisps, are capable of being fabricated with a standard and desirable shape. The frying of individual pieces presents numerous difficulties such as wrinkling, folding, clumping, and sticking to cooking surfaces. With the use of a form fryer, as opposed to other types of frying, a number of these difficulties can be resolved.

While form fryers resolve a significant number of problems in frying snack pieces, form fryers require a significant volume of oil. A large volume of equipment, along with the food product to be fried, must pass through hot oil and remain submerged for a time sufficient to cook the product. In traditional form fryers, there must be enough oil to submerge two conveyor belts, at least one product mold, and the product to be cooked. A considerable amount of energy, and thus money, is required to heat, pump and maintain this large volume of oil.

In addition, there is significant expenditure associated with replacing oxidized oil with fresh oil. Because form fryers typically have at least one conveyor with surfaces that cycle between the air and oil, the equipment itself introduces oxygen to the oil. Oil in the system gradually becomes oxidized as it absorbs oxygen at the air/oil interface and from submerging conveyor material. Oil oxidation causes oil to go rancid over time, thus the oxidized oil in the system must be replaced with fresh oil periodically. It would therefore be advantageous to reduce the volume of submerged equipment without adversely affecting the performance of the fryer. If the volume of submerged equipment can be reduced, the opportunity for such equipment to introduce oxygen into the oil can be reduced, thus slowing oxidation and reducing costs associated with replacing oxidized oil with fresh oil. In addition, expenditures for heating, pumping, and maintaining the oil can also be reduced.

A desirable feature of molded snack pieces is that they can be made uniform in size and shape. With uniformity, the snack pieces can be packaged in a seated alignment. This allows for the packaging of snack product into a canister as opposed to being packed loosely in a bag. Canister packaging provides a degree of protection against breakage of the snack pieces while providing improved transportability of the snack pieces both in bulk and in individual canisters. Also, canisters can be sealed with a lid after opening to deter product degradation.

For packaging of uniformly shaped product such as curved ellipses, (for example, an ellipse having its longer sides curved upward in the same direction) snack pieces are stacked first before filling in a canister. Snack pieces can be stacked one directly over another, or they can be partially overlapped in a similar manner as rooftop shingles are overlapped. After such overlapping, the product pieces are then pushed together so that each piece is directly over the other. While it is possible to stack curved product pieces either with concave sides up or concave sides down, the product pieces may be more amenable to stacking in one particular orientation, depending on the product shape.

For example, thin, elliptical product pieces having upwardly-curved sides are more easily stacked with their concave sides down rather than up. In the event that two adjacent product pieces fail to overlap, those pieces can only be forced to stack one over the other if their adjacent edges are at different heights. With their concave sides up, two adjacent elliptical product pieces cannot be restacked because their adjacent product edges would lie flat against the conveyor, and those edges would confront each other upon pushing the pieces together. With their concave sides down, however, the product pieces are able to rock back and forth on their downwardly curving edges in the direction of travel. This ability to rock makes it highly unlikely that the adjacent edges of two pieces would confront each other at the same vertical level. One product piece will thus be able to overlap and eventually stack over the other.

Conventional molds are convex and produce shaped snack pieces with concave sides facing upwards and away from the bottom belt. While the concave-side up orientation may be more suitable for seasoning, the concave-side down orientation, as previously explained, is often better for stacking. The product therefore must be flipped prior to packaging. If the cooked product left the fryer with concave sides facing down towards the fryer bottom belt, the product would not require flipping, albeit at the slight expense of seasoning efficiency.

Another problem encountered with prior art form fryers is the difficulty of providing a bottom conveyor that can accommodate the evolving shape of cooking product. As the product to be fried typically enters the fryer with one shape and exits with another, it is difficult to design a prior art bottom conveyor with product receptacles that can accommodate the shapes of both pre-forms and cooked product.

Still another problem encountered with prior art form fryers is the tendency of frying product pieces to shift from their desired positions or orientations against their respective mold surfaces. For example, when frying dough pieces up against a convex mold surface, the upward forces during frying can upset the centered placement of such dough pieces. The upward forces, often produced by evolving gas, can dislodge the dough pieces and cause them to shift to one side of the mold, which then results in deformed products. In extreme situations, dough pieces may even come to rest between or across adjacent mold surfaces.

Therefore, an improved form-frying device is desired. An improved form-frying device should eliminate the bottom conveyor and instead have separate bottom entrance and bottom exit conveyors, leaving a reduced volume segment between the two bottom conveyors. By eliminating the bottom conveyor in the reduced volume segment, less oil would be needed within the fryer system, and money can be saved on oil heating, pumping, maintenance, and replacement. Also, product should leave the improved form-frying device with an orientation appropriate for stacking, thereby eliminating the need for product flipping. By eliminating the product-flipping step, one can eliminate the cost of product-flipping machinery, as well as losses associated with product jam-ups in the flipping machinery. Furthermore, an improved form-frying device should have product-centering elements secured between individual mold surfaces to keep frying product pieces relatively centered against their respective mold surfaces.

SUMMARY OF THE INVENTION

A form fryer in accordance with the present invention has a top conveyor to produce cooked snack pieces such as fabricated potato crisps with a desired shape. The top conveyor is disposed longitudinally within the fryer and is positioned above a fryer oil pan. Uncooked snack pieces are then delivered by a bottom entrance conveyor into oil within the fryer oil pan for cooking. After delivering the uncooked snack pieces, the bottom entrance conveyor is configured to rotate away from the fryer oil pan after delivering the uncooked snack pieces. The snack pieces then rise up in the oil and dispose themselves against molding surfaces on the top conveyor.

Once the snack pieces are disposed against the top conveyor, the top conveyor may be directed through a reduced oil volume segment within the fryer oil pan. The reduced volume segment cooks the snack pieces without having a continuous bottom conveyor passing therethrough. As no bottom conveyor is required in the reduced volume segment, considerable savings are possible in that less oil need be used in the fryer. With less oil to heat, pump, and maintain, oil processing and maintenance expenditures can be reduced. In addition, eliminating the bottom conveyor in the reduced volume segment decreases the amount of oil oxidation that occurs due to submerging equipment. This reduction in oil oxidation creates further savings by reducing oil replacement costs.

Molding surfaces on the top conveyor may preferably comprise molds having a uniform shape. Particularly, the molds may be of a concave or a convex shape. As the top conveyor declines and pushes the snack pieces into the oil, the snack pieces conform to the shape of the mold surfaces and emerge with those shapes. A bottom exit conveyor is provided to collect the cooked snack pieces from the molding surfaces of the top conveyor. Additionally, the molding surfaces may be selected to produce uniformly shaped snack pieces that are either convexly or concavely shaped when viewed from above and carried upon the bottom exit conveyor. For example, shapes having curved edges such as ellipses, squares, circles, or rectangles are possible. Where the top conveyor mold surfaces are convex relative to the snack pieces below, the molds are preferably equipped with product-centering elements for keeping the snack pieces aligned and centered against their respective mold surfaces.

At the terminal portion of the fryer oil pan, cooked snack pieces are delivered from the top conveyor to a bottom exit conveyor. Thereafter, the cooked snack pieces exit the fryer and are moved along for, if desired, seasoning and packaging. Each successive conveyor after the bottom exit conveyor may be interlaced with the previous conveyor to transfer product smoothly between conveyors without losing control over the product.

By having separate bottom entrance and bottom exit conveyors, the two bottom conveyors can be tailored to the differing entrance and exit environments and product shapes. As pre-forms usually are shaped differently from cooked product, the entrance and exit conveyors can have receptacles or seats designed specifically for the shape of product to be carried. The entrance and exit conveyors can be made of different materials, and they can even be designed to operate at different speeds.

Another advantage of having separate entrance and exit conveyors is that the velocity of each conveyor can be adjusted to provide for a more positively controlled transfer between each conveyor. For example, the bottom entrance conveyor can be maintained at a slightly slower velocity than the velocities of the oil, the top conveyor, and the bottom exit conveyor. In so doing, the oil effectively pulls the product away from the bottom entrance conveyor so that the product can meet with top conveyor.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives, and advantages thereof, will be best understood by reference to the following detailed description of illustrative embodiments when read in conjunction with the accompanying drawings, wherein:

FIG. 17b is a front sectional view of the snack pieces and interlaced conveyors of FIG. 17a;

FIG. 20 is a partial top perspective view of molds disposed on a top conveyor similar to that shown in FIG. 9 and having product-centering elements secured between mold segments.

DETAILED DESCRIPTION

Figure 2:
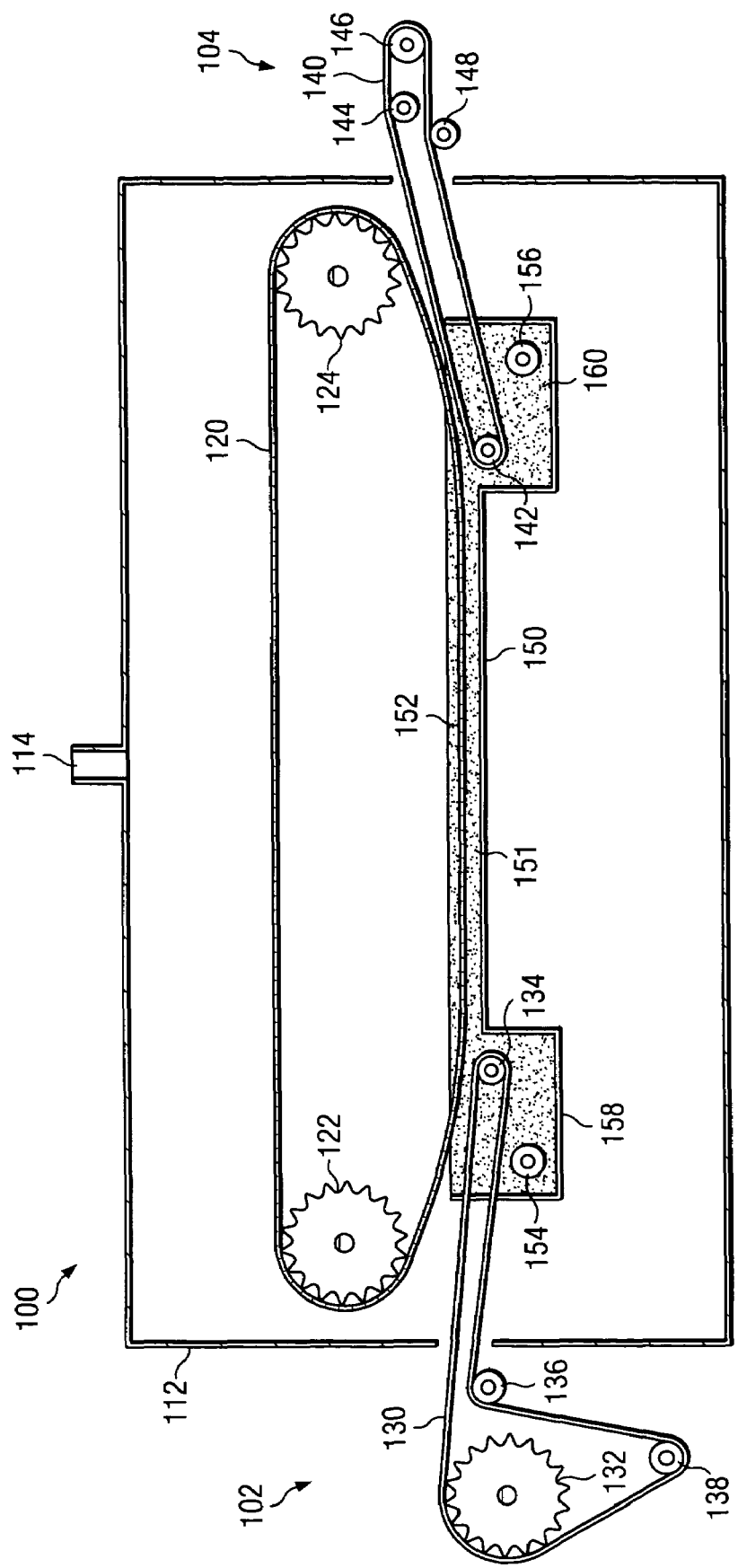
FIG. 2 is a schematic cross sectional view of a form fryer in accordance with the present invention.

A form fryer for cooking snack products in accordance with one embodiment of the invention is shown in FIG. 2. A fryer assembly 100 receives snack products to be fried at an entrance area 102. After cooking, the snack products exit the fryer assembly 100 at an exit area 104. Between the entrance area 102 and the exit area 104 is a fryer housing 112 having a port 114 for controlling the fryer environment above the cooking snack products. While shown as a single port, the port 114 is merely representative of numerous ports that can be provided as desired to effect additional embodiments. As shown, the fryer assembly 100 may be used to cook snack pieces made substantially from potatoes such as a dough comprising flaked dehydrated potatoes. Snack pieces formed by the present invention, however, may be comprised of alternative farinaceous mixtures.

Prior to being cooked, dough, formulated to produce the preferred snack pieces, is formed and sheeted into pre-forms (uncooked snack pieces). The dough typically comprises a substantially dry mixture of starch product, sugar and other additives. Examples of starch products that may be utilized include any starches, native (unmodified) and modified, selected for their ability to improve the texture, consistency, and durability of food products and to improve the processing of dough into food products, all as known in the field of art.

Returning to FIG. 2, the fryer assembly 100 processes pre-forms (not shown) through a form fryer with a top conveyor 120, a bottom entrance conveyor 130, and a bottom exit conveyor 140. On the top conveyor 120, a plurality of molds (not shown) are distributed about its exterior circumference for engaging and molding pre-forms to produce cooked shaped snack pieces. The top conveyor 120 may comprise an oil-pervious, chain-link structure of a durable material such as stainless steel or other metals, a ceramic, or a polymer-based material capable of withstanding exposure to hot oil. Supporting and conducting the top conveyor 120 are two rollers 122, 124. As shown, the two rollers 122, 124 may include teeth for engaging the top conveyor 120 to power the rotation. Generally, rotational power is provided by only one of the two rollers 122, 124.

For cooking, pre-forms are fed toward the top conveyor 120 on the bottom entrance conveyor 130. The bottom entrance conveyor 130 may comprise an oil-pervious, chain-link structure of a durable material such as stainless steel or another type of metal, a ceramic, or a polymer-based material capable of withstanding exposure to hot oil. Alternatively, the bottom entrance conveyor 130 may also comprise any food-grade, perforated, durable, but flexible material able to withstand frying oil temperatures. The bottom entrance conveyor 130 is supported and conducted by several rollers 132, 134, 136, 138, at least one of which is a submerged roller 134. As shown in FIG. 2, the path of the bottom entrance conveyor 130 about several rollers 132, 134, 136, 138 is one example of an entrance conveyor pathway in accordance with the invention. Desirable pathways include those that minimize removal of fryer oil, allow for cooling of the entrance conveyor, and are otherwise economical. The pathway set forth by this arrangement of rollers shown allows the bottom entrance conveyor 130 to pass through an area outside of the fryer housing 112. Traveling through an area outside of the fryer housing 112 allows the bottom entrance conveyor 130 to cool or be cooled prior to contacting pre-forms. Cooling the bottom entrance conveyor 130 helps minimize pre-form exposure to heat before entering the cooking oil 152. Such pre-cooking heat exposure can cause undesirable pre-form deformation and wrinkling.

The configuration in FIG. 2 is also beneficial because rotational power can be supplied to a roller outside of the fryer housing 112, such as the input-side roller 132. As the volume of a fryer housing is normally minimized for economical reasons such as heating and control of the fryer atmosphere, positioning equipment such as the input-side roller 132 outside of the fryer housing 112 is desirable. As will be shown, additional pathways are possible.

At about the input-side roller 132, pre-forms are deposited onto a feeding segment of the bottom entrance conveyor 130 and are conducted into the fryer housing 112. Alternatively, pre-forms can be deposited onto the bottom entrance conveyor 130 at a point closer to where the pre-forms enter the oil in order to reduce exposure to heat prior to immersion in the cooking oil 152.

As pre-immersion thermal stress can cause pre-forms to wrinkle and deform, it is important to reduce heat exposure prior to cooking in the oil 152. Pre-immersion heat exposure also makes the pre-forms more likely to stick to the bottom entrance conveyor, which makes it more difficult to transfer the pre-forms to the top conveyor. Another way to reduce pre-immersion heat exposure is to minimize the length of the feeding segment of the bottom entrance conveyor. The feeding segment is the top surface of the bottom entrance conveyor between the input-side roller 132 and the submerged roller 134. For example, the bottom entrance conveyor can be led horizontally into the fryer housing, then tilted downwards into the oil as soon as possible after reaching the oil pan 150.

However, the bottom entrance conveyor must also be titled downwards so that pre-forms on the bottom entrance conveyor 130 approach a location where the top conveyor 120 parallels and is in close proximity with the bottom entrance conveyor 130. The pre-forms are strategically positioned in formation on the surface of the bottom entrance conveyor 130 for eventual meeting with the molds on the top conveyor 120. At the point where the top and bottom conveyors begin to parallel each other in close proximity, pre-forms are disposed between the molds on the top conveyor 120 from above and the exterior surface of the bottom entrance conveyor 130 from below. To direct the pre-forms into the fryer oil pan 150 for cooking in the hot oil 152, the top conveyor 120 and bottom entrance conveyor 130 are guided along an arcuate pathway into the oil 152.

It is important to note that the gap between the top conveyor 120 and the bottom entrance conveyor 130, as well the angle at which both conveyors 120, 130 enter the oil, should be adjusted so that at least a portion of each pre-form is in contact with at least one conveyor at any time. If the gap and angle are not properly adjusted, the horizontal distance between the conveyors 120, 130 at the oil surface may be larger than the product length. The entire product must then remain at or near the oil surface for some distance while being transferred from the bottom entrance conveyor 130 to the top conveyor 120, during which time product control is undesirably lost. Thus, the gap and angle must be controlled.

When both the conveyor gap and angle are properly adjusted, the length of the air/oil interface between the top conveyor 120 and bottom conveyor 130 should be less than the length of each pre-form. In other words, the horizontal distance between the top conveyor 120 and the bottom entrance conveyor 130 at the oil surface, also known as the float length, should be less than the product length. This ensures that the product is under positive control at all times. For example, at a very shallow approach angle into the oil, only a small gap between the top conveyor 120 and bottom entrance conveyor 130 can be tolerated before the horizontal distance between them at the oil surface becomes as large as the product length. At a steep approach angle, however, a larger vertical gap between the two conveyors 120, 130 can be tolerated before the horizontal distance between them at the oil surface becomes as large as the product length. By keeping the float length shorter than the product length, at least one conveyor will be in contact with at least a portion of the product at any time in order to exert positive control over the product.

After the bottom entrance conveyor 130 contacts the oil 152 in an oil pan entrance area 158, the snack pieces encounter the hot oil 152 and begin to fry. At the same time that the frying begins, the declining top conveyor 120 forces the pre-forms to take the shape of the molds on the top conveyor 120. Once the product is against the molds of the top conveyor 120, the bottom entrance conveyor 130 is no longer needed for the cooking of these snack pieces. The bottom entrance conveyor 130 then rotates about a submerged roller 134 and begins its return path to receive new pre-forms. This returning segment of the bottom entrance conveyor 130 is called the post-feeding segment. It should be noted that the pathways of the bottom entrance conveyor 130 and the bottom exit conveyor 140 are at least partially inclined in order to deliver the pre-forms into the oil from above.

It is important to note that the pre-forms do not necessarily have to be less dense than the oil 152 in order to remain against the molds of the top conveyor 120. The while it is true that heavier-than-oil pre-forms would sink in stagnant oil, gases evolved from the oil 152 during cooking provide an upward force against the pre-forms. This upward force keeps the pre-forms firmly seated against the top conveyor molds.

Figure 1:
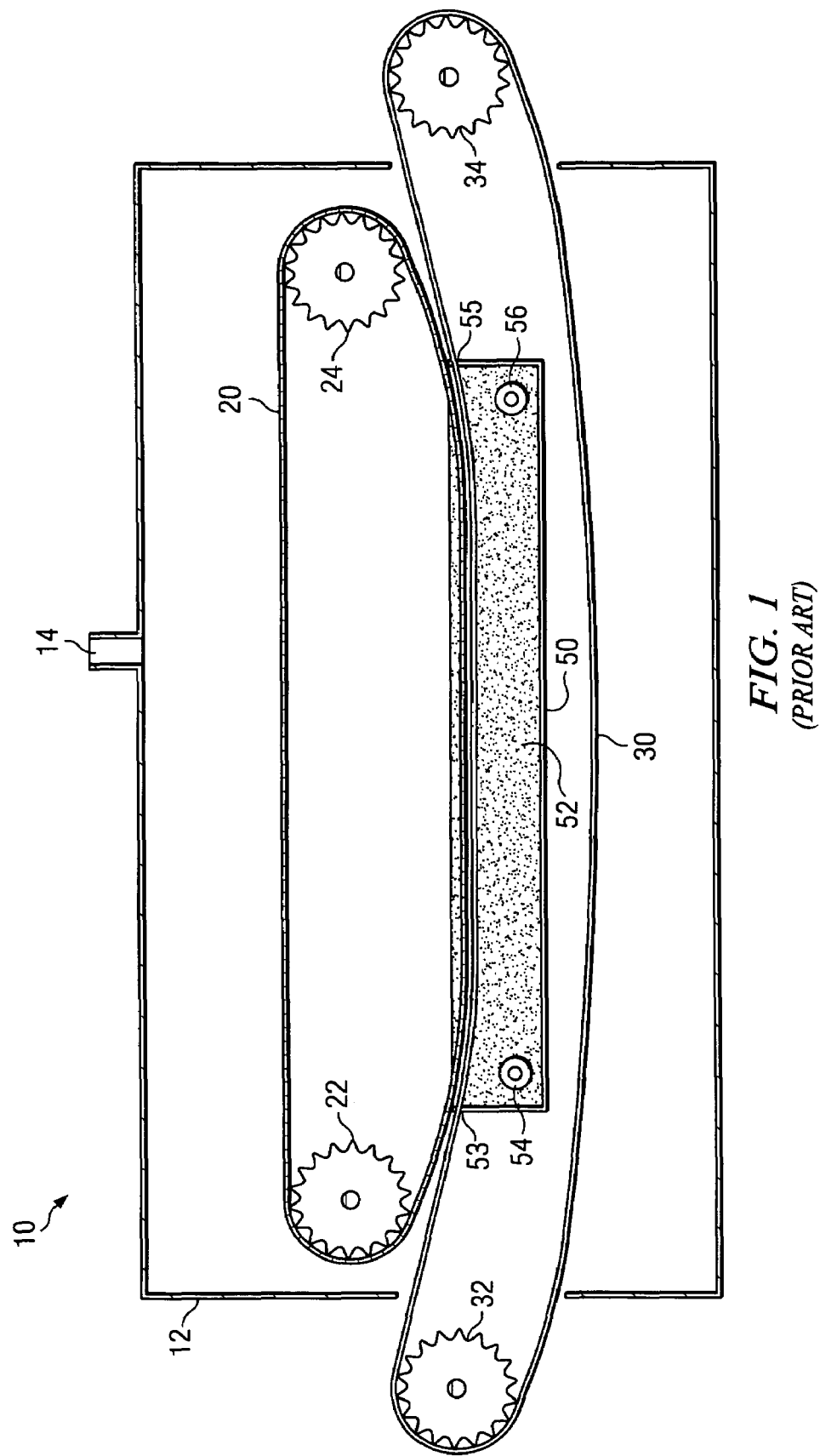
FIG. 1 is a schematic cross sectional view of a prior art form fryer with continuous top and bottom conveyors.

Unlike conventional form fryers as shown and discussed above for the prior art fryer shown in FIG. 1, the discussed fryer assembly 100 and other fryer assemblies in accordance with the invention do not continue the bottom conveyor through the entire oil pan. As shown in FIG. 2, this allows for at least some segment of the fryer oil pan 150 to have a reduced volume segment 151.

Referring back to FIG. 2, the oil pan entrance area 158 is a section of the fryer oil pan 150 that is large enough to accommodate a submerged roller 134 and a fryer oil inlet 154. Hot oil 152 is circulated through the fryer oil pan 150 so that the oil 152 flows generally along and with the snack pieces as they cook. The oil inlet 154 provides the oil at the beginning of the oil pan 150, and the oil outlet 156 receives the oil at the end of the oil pan 150. Between the oil outlet 156 and the oil inlet 154, the oil may be purified, heated, and pumped if needed. In the preferred embodiment, the oil 152 travels with a velocity equal to or slightly less than that of the product and the top conveyor 120 in order to minimize disturbance of the product as it cooks. In addition, the velocities of the oil 152 and the various conveyors 120, 130, 140 can be stepped up from one to the next to increase positive control over the product. For example, the oil 152 can be made to flow slightly faster than the bottom entrance conveyor 130 in order to help dislodge the product from the bottom entrance conveyor 130. The top conveyor 120 can, in turn, be designed to move slightly faster than the oil 152 in order to keep the product pressed firmly against the top conveyor molds. Likewise, the bottom exit conveyor 140, to be later described, can move either at the same speed or slightly faster than the top conveyor 120 in order to properly transfer product from the top conveyor 120 to the bottom exit conveyor 140.

After the product travels downstream through the oil pan entrance area 158, a reduced volume segment 151 is encountered. As the width of the fryer oil pan does not change, it is the height in this segment 151 that is reduced. This reduction is possible along this segment because of the absence of a bottom conveyor, thus oil 152 is only needed at about where the snack pieces are cooking along the top conveyor 120. Therefore, the height along this segment 151 needs to at least accommodate the height of a top conveyor 120 with its molds but does not have to accommodate the height of two conveyors. Prior art form fryer assemblies utilizing conveyors require a volume of oil large enough to submerge a top conveyor with molds, a lower conveyor used to transport snack pieces into and out of the cooking oil 152, as well as rollers and other equipment necessary to guide those conveyors. This renders prior art form fryer assemblies more expensive to operate because of the need to heat, purify, pump, and maintain a larger volume of oil. Having a reduced volume segment 151 with no bottom conveyor, in accordance with the present invention, thus reduces the oil volume and cuts costs associated with oil heating and maintenance.

In addition, the reduced volume segment 151 with no bottom conveyor helps reduce the expenditure associated with replacing oxidized oil with fresh oil. Because there is no bottom conveyor throughout the reduced volume segment 151, there is less bottom conveyor material submerged in the oil at any time. Hence there is less opportunity for the bottom conveyors to introduce oxygen into the oil to oxidize it. This reduces the rate at which the oil becomes oxidized, as well the rate at which oxidized oil must be replaced with fresh oil. This is beneficial because oil oxidation causes the cooking oil 152 to go rancid, which in turn decreases the freshness of the product. Reducing oil oxidation therefore reduces costs expended to keep both the oil 152 and the product fresh.

Because the form fryer 100 with the reduced volume segment 151 dispenses with the need for a bottom conveyor through a portion of the fryer, less conveyor material is needed to bring pre-forms into the fryer. This means that less energy is therefore required to cool the bottom conveyor material before it receives pre-forms for transportation into the fryer. Having less bottom conveyor material also reduces the amount of necessary support machinery, such as rollers, supports, and drive shafts, which in turn reduces the likelihood of mechanical jams and malfunctions. Thus, the form fryer 100 with the reduced volume segment 151 can increase productivity both by reducing heating and cooling costs, as well as reducing the occurrence of mechanical malfunctions.

In the preferred embodiment, the oil pan 150 itself serves as a heat-exchanging surface through which heat may be transferred to the oil. To increase the heat-exchanging surface area, the oil pan 150 can be contoured or fluted. For example, the oil pan 150 may comprise a waved, rippled, or finned pan. Oil 152 thus flows in and above channels that run down the length of the oil pan 150. Such contoured or fluted oil pans provide a higher surface-area-per-volume ratio, allowing one to more efficiently replenish the heat dissipated and absorbed by cooking product as the oil travels along the fryer.

In order to keep the oil 152 in the fryer at the proper frying temperature, heated fluid may be provided to flow under and in contact with the oil pan 150. Other methods of heating the oil pan 150 are acceptable, such as using electrical heating elements under the oil pan, or using a radiative heat source to provide heat.

At the end of the reduced volume segment 151, snack pieces pass through the fryer oil pan exit 160. The fryer oil pan 150 at the exit 160 has an enlarged depth similar to the segment at the oil pan entrance area 158, but the depths of the entrance and exit sections are not necessarily identical. In the exit area, the bottom exit conveyor 140 approaches and parallels the top conveyor 120 after passing a submerged roller 142.

The bottom exit conveyor 140 is supported and rotated through a pathway, defined by several rollers 142, 144, 146, 148, which demonstrates one of many possible fryer exit conveyor pathways. Like the bottom entrance conveyor 130, the bottom exit conveyor 140 is constructed of any food-grade, flexible and durable materials that can withstand fryer processing conditions, such as metal, various plastics, or ceramics. The bottom exit conveyor 140 should also comprise an oil-pervious structure so that oil can pass through the conveyor.

A submerged roller 142 is situated before and below the point where the top conveyor 120 and the bottom exit conveyor 140 parallel each other in close proximity in order to allow the bottom exit conveyor 140 to gently approach the now cooked snack pieces. As the top and bottom conveyors 120, 140, with the cooked snack pieces encased between, exit the cooking oil 152, the upward forces of the cooking oil 152 no longer support the snack pieces against the top conveyor 120. The snack pieces are then directed into contact with a receiving segment of the bottom exit conveyor 140. If needed, steam or inert gas may be blown through or at the molds to assist the cooked snack pieces in their departure from mold surfaces. The bottom exit conveyor 140 should run parallel to the top conveyor 120 for some distance after it exits the oil 152 so that the product falls into its proper position when it finally dislodges. After passing over an exit-side roller 146, the cooked snack pieces are passed on for seasoning and packaging. After passing over the exit-side roller 146, the bottom exit conveyor 140 is directed back into the oil 152 to receive more snack pieces. This returning segment of the bottom exit conveyor is called the pre-receiving segment.

Note that FIG. 2 shows how the bottom exit conveyor transitions from an inclined path out of the fryer to a horizontal path before sending product to the next conveyor. At high conveying speeds, it is important for this transition to be as smooth and gradual as possible in order to prevent the product from losing contact with bottom exit conveyor 140. While FIG. 2 shows only one roller 144 in the transition between the inclined and horizontal sections, additional rollers may be used to make the change as gradual as possible.

Because the bottom entrance and exit conveyors 130, 140 operate independently from one another, each conveyor can be specifically designed for their respective product shapes. While the entrance conveyor 130, for example, might have a flat surface or a plurality of flat platforms for receiving flat pre-forms, the exit conveyor 140 might instead have curved saddles for receiving curved, cooked product. In addition, the bottom conveyors 130, 140 can be made from different materials and have different structures to suit their respective functions.

Another advantage of having separate entrance and exit conveyors 130, 140 is the ability to operate each one at a different speed. The bottom entrance conveyor 130 has a delivering velocity $V_{delivering}$, the oil 152 has an oil velocity $V_{oil}$, the top conveyor 120 has a top conveyor velocity $V_{top\ conveyor}$, the bottom exit conveyor 140 has a removing velocity $V_{removing}$, and the velocities of all four mediums may share the following relationship:

$$V_{delivering} \leq V_{oil} \leq V_{top\ conveyor} \leq V_{removing}.$$

In the preferred embodiment, the velocity of the exit conveyor 140 is either equal to or slightly greater than the velocity of the top conveyor 120, which is slightly greater than the velocity of the oil 152, which in turn is slightly greater than the velocity of the entrance conveyor 130. By operating each successive conveyor at a transporting velocity slightly greater than that of the preceding conveyor, more positive control can be maintained over the product, particularly at the inlet. Each successive medium in effect pulls the product along and away from the preceding medium.

However, if the cooked product tends to temporarily adhere to molds of the top conveyor 120 after exiting the oil 152, it is desirable to run the bottom exit conveyor 140 and top conveyor 120 at the same speed. This ensures that the product pieces fall into their proper places upon the bottom exit conveyor 140 after they finally dislodge from the top conveyor 120.

FIGS. 3–8 show several alternative embodiments in accordance with the present invention for fryer entrance area 202 and exit area 204. The fryer entrance area 202 in these figures comprises the same features and is of similar design and construction as described above for the fryer entrance area 102 in FIG. 2. Now referring to FIGS. 3–8 simultaneously, the fryer housing 212 is shown with the top conveyor 220 supported by two rollers 222, 224. A bottom entrance conveyor 230, having a feeding segment and a post-feeding segment, is supported by at least two of several rollers 232, 234, 235, 236, 237, 238. A fryer oil pan 250 contains hot oil 252. An area sufficient to contain an oil inlet 254 and at least one roller to support the bottom entrance conveyor 230 is shown within the oil pan entrance area 258.

In cooking, pre-forms are deposited onto the feeding segment of the bottom entrance conveyor 230 prior to entry into the fryer housing 212. As the pre-forms are conveyed into the oil, frying starts at a cooking start point 226. Thereafter, the snack pieces first begin to separate from the surface of the bottom entrance conveyor 230. Next, the portion of each piece that has separated from the bottom entrance conveyor 230 temporarily remains at the surface of the oil 252 before contacting the top conveyor 220. A submerged roller 234 in the oil pan entrance area 258 directs the post-feeding segment of the bottom entrance conveyor 230 back to collect new pre-forms for frying. The snack pieces, at the latest upon reaching the submerged roller 234, are disposed against the surfaces of the molds on the top conveyor 220. The snack pieces in position against the top conveyor 220 are then carried into a reduced volume segment 251 for completion of the cooking process. This reduced volume segment 251, shown in FIGS. 3–8, has the same characteristics and advantages as the reduced volume segment 151 of FIG. 2. These advantages include, but are not limited to, a reduction in oil heating, pumping, maintenance and replacement costs, a reduction in oil oxidation, a reduction in bottom conveyor cooling costs, and increased productivity due to a lower likelihood of mechanical failure.

Figure 3:
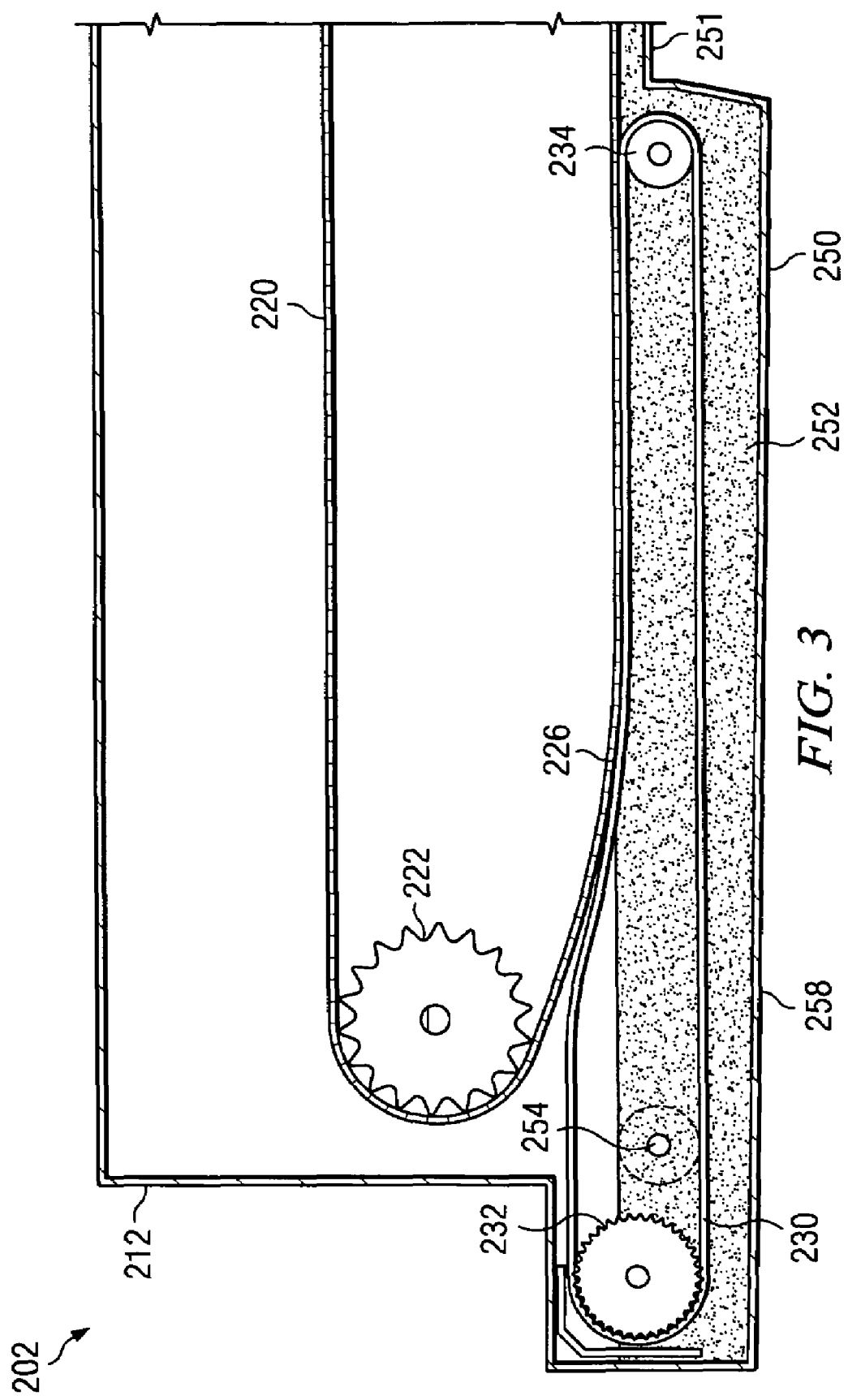
FIGS. 3–6 are schematic cross sectional views of form fryer entrance sections in accordance with the present invention showing various configurations of bottom entrance conveyors.

In FIG. 3, a bottom entrance conveyor 230 is shown completely within an elongated section of an oil pan entrance area 258. This elongated section allows the conveyor to be completely within the fryer housing 212, which does not allow for cooling outside of the fryer housing 212. This reduces heat loss, reduces oil oxidation, and simplifies the path for the bottom entrance conveyor 230. However, depending on the application and materials involved, such arrangement may impart excessive heat to the pre-forms.

Figure 4:
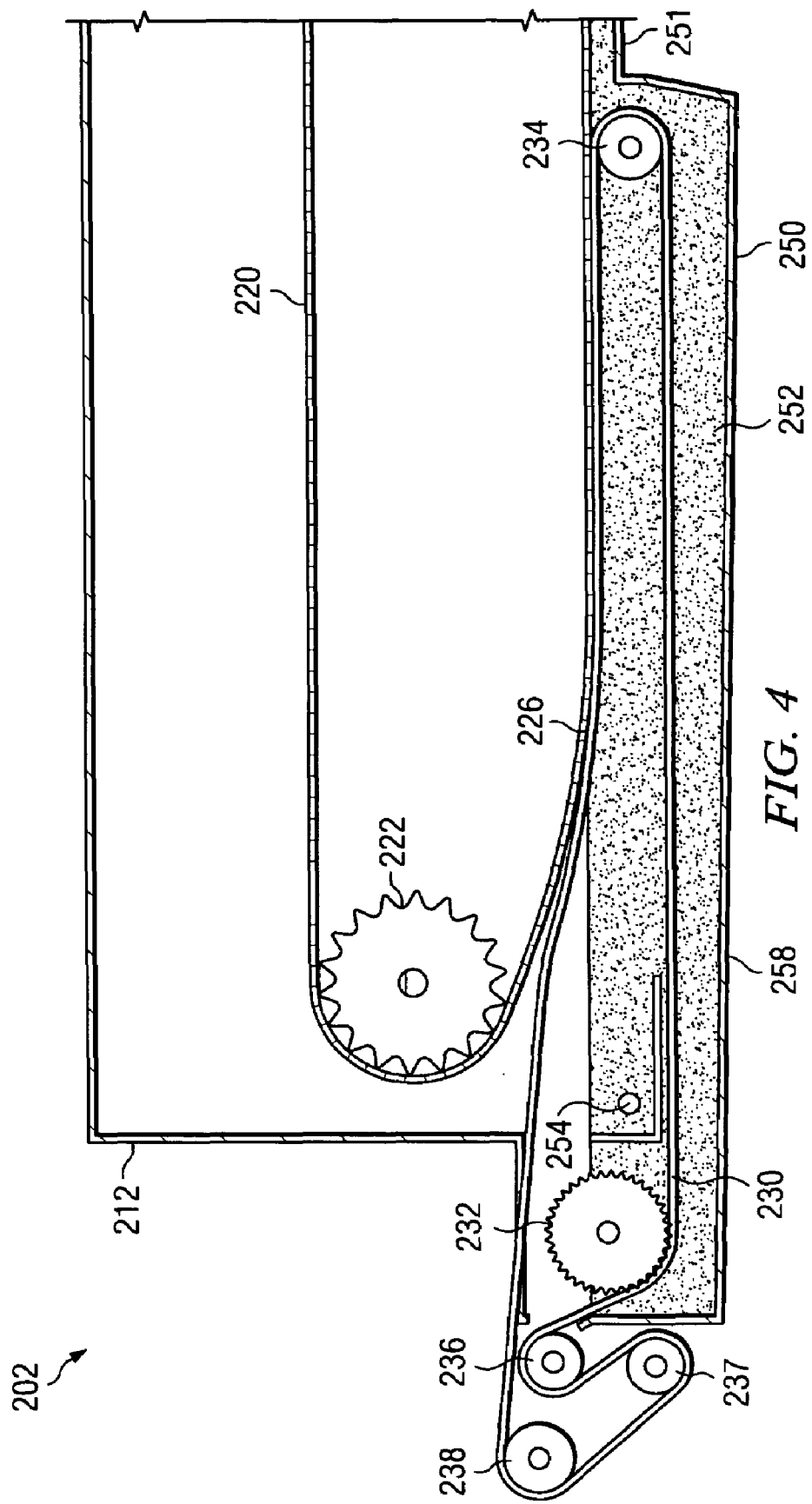

FIG. 4 shows a bottom entrance conveyor 230 following a pathway that has a substantial portion external to the fryer housing 212. As the bottom entrance conveyor 230 expands from exposure to the hot cooking oil and stretching, one or more of the rollers may be provided with the ability to move so that the conveyor can remain taut. For example, the lower, external, input-side roller 237 can move toward or away from the upper, external, input-side roller 238 to loosen or tighten the bottom entrance conveyor 230 as desired. This embodiment allows for significant cooling of the bottom conveyor 230.

Figure 5:
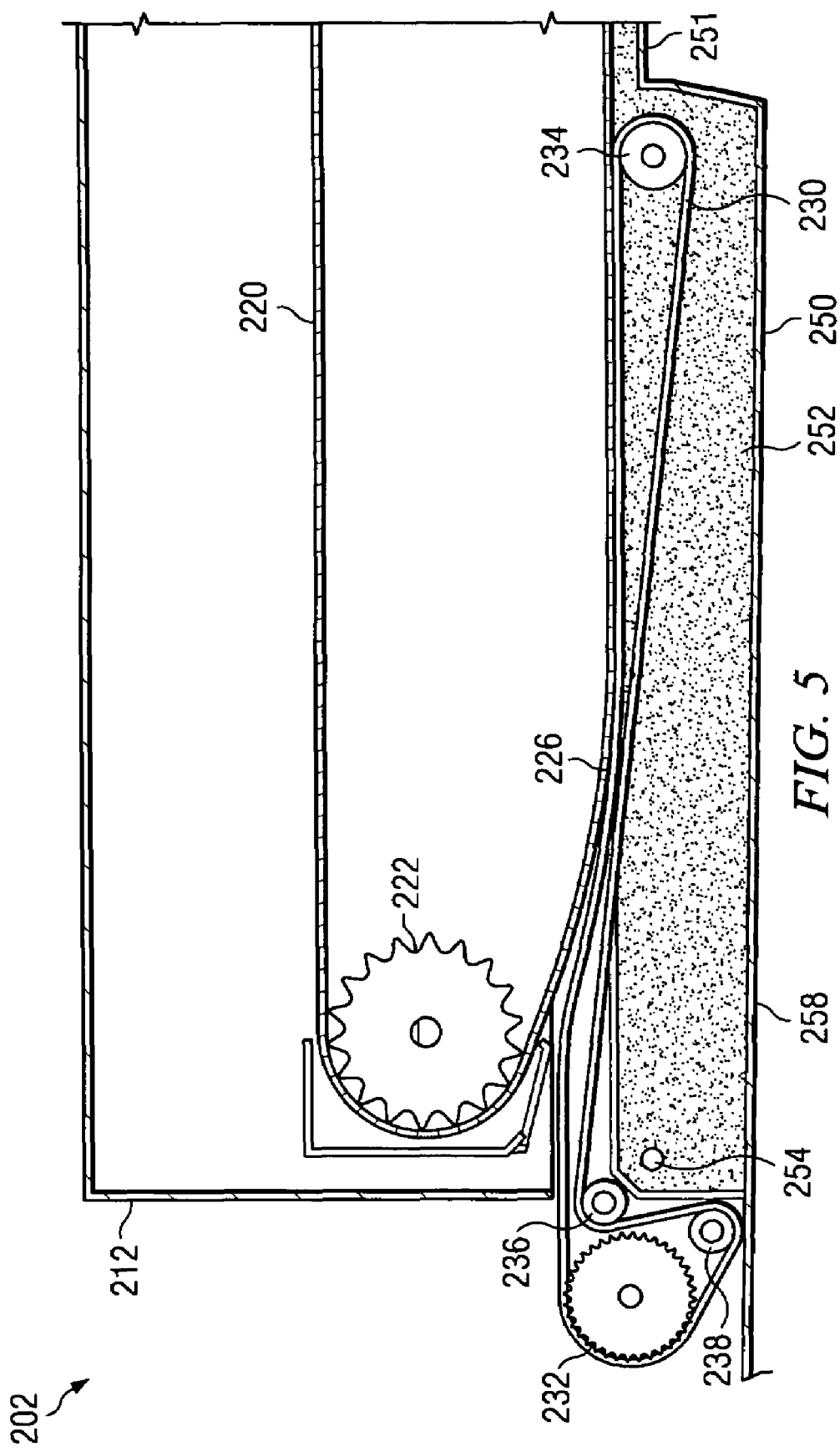

Rotation may be provided from a roller positioned outside of the fryer housing 212 as shown in FIG. 5. This is advantageous, as the drive mechanism would not need to be outfitted to operate with a drive-shaft submerged in the hot oil 252. Simplifying the mechanisms within the hot oil 252 and the fryer housing 212 is beneficial because the size of the oil pan entrance area 258, and thus the volume of oil contained within, can be reduced. Further, a smaller portion of the equipment is exposed to heat and oil at any given time, thus reducing maintenance and cleaning intervals.

Figure 6:
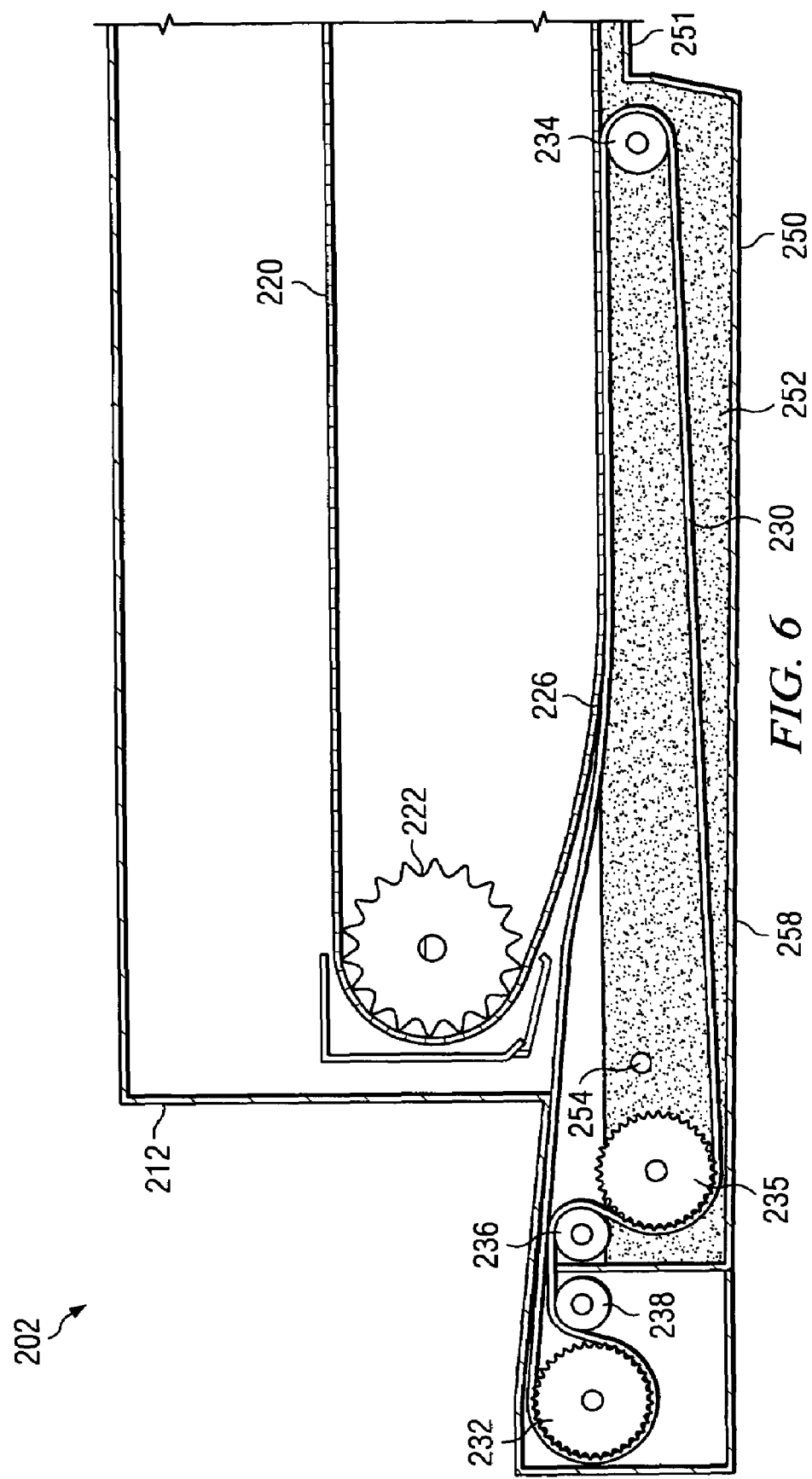

FIG. 6 shows an additional pathway for the bottom entrance conveyor 230. In FIG. 6, the bottom entrance conveyor 230 is lead out of the hot oil 252 by two rollers 235, 236 near the fryer entrance, but the bottom entrance conveyor 230 still remains within the fryer housing 212. This arrangement gives the bottom entrance conveyor 230 an opportunity to cool before receiving pre-forms without exposing the conveyor to the environment outside the fryer. FIG. 6 also shows, as does FIG. 4, an oil inlet 254 positioned between the feeding and post-feeding segments of the bottom entrance conveyor 230. With the oil inlet 254 so positioned, the oil passes through only the feeding segment of the bottom entrance conveyor 230 rather than both the feeding and post-feeding segments as it flows from the oil inlet 254 to the reduced volume segment 251. As there is one less layer of conveyor to hinder fluid flowing from the inlet 251 towards the exit of the fryer, less pressure is therefore needed to pump the oil 252 through the fryer at the desired flow rate.

Figure 7:
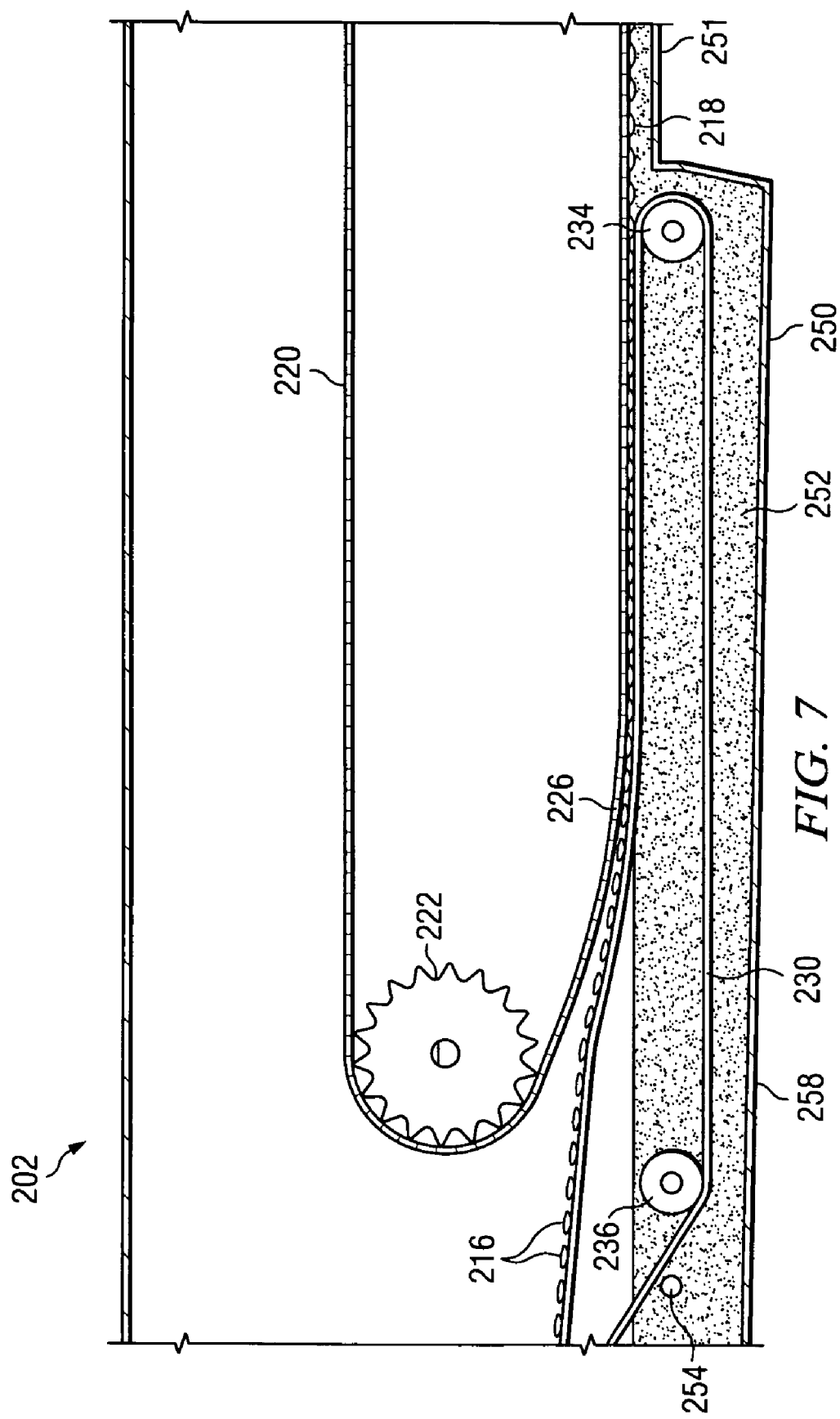
FIG. 7 is a partial schematic cross sectional view of an additional embodiment of a form fryer entrance section in accordance with FIGS. 3–6 showing snack pieces being fed into the fryer oil.

In FIG. 7, another embodiment of a fryer entrance area 202 is shown with several pre-forms 216 disposed on the feeding segment of a bottom entrance conveyor 230. As pre-forms 216 are directed along towards the oil 252, molds on the surface of the top conveyor 220 are disposed directly above. As pre-forms 216 enter the oil 252 at a cooking start point 226, they are pushed downwards into the oil by the declining top conveyor 220 and wrap against the surface of the molds. After a submerged roller 234 redirects the bottom entrance conveyor 230 out of the oil 252 to receive more pre-forms, the cooking snack pieces 218 are conveyed along with the top conveyor 220 toward and through a reduced volume segment 251 having no bottom conveyor disposed beneath. As mentioned in the description of FIG. 2, oil 252 flows along with the product in order to minimize product disturbance.

Figure 8:
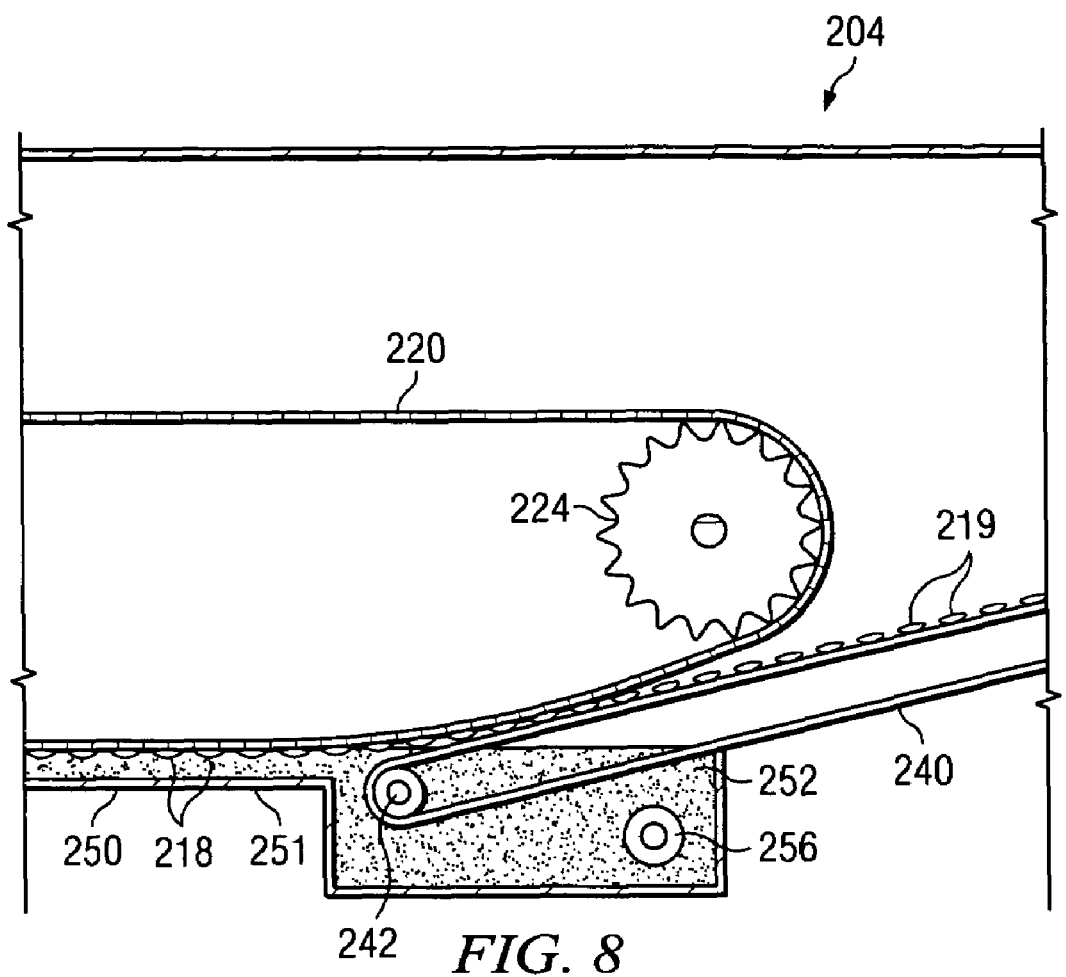
FIG. 8 is a schematic cross sectional view of a form fryer exit section in accordance with the present invention that can be utilized with the fryer entrance sections of FIGS. 3–7 showing snack pieces being collected from the fryer oil.

FIG. 8 shows a plurality of cooking snack pieces 218 within the fryer exit area 204. The fryer exit area 204 of FIG. 8 comprises the same features and is of similar design and construction as described above for the fryer exit area 104 in FIG. 2. At the end of the reduced volume segment 251, the snack pieces 218 are conveyed over a section of the oil pan 250 containing a bottom exit conveyor 240. The bottom exit conveyor 240 is provided at an inclined angle that provides for a submerged roller 242 to be disposed sufficiently beneath the top conveyor 220. Thereby, the cooking snack pieces 218, which are still positioned against the mold surfaces of the top conveyor 220, will be disposed between the top conveyor 220 and the bottom exit conveyor 240 as the bottom exit conveyor 240 rises and rotates away from the submerged roller 242. Once free from contact with the oil 252, fully cooked snack pieces 219 either freely separate from the molds of the top conveyor 220 or may be dislodged with the use of steam or inert gas jets. Thereafter, the fully cooked snack pieces 219 are conveyed for seasoning and packaging.

Figure 9:
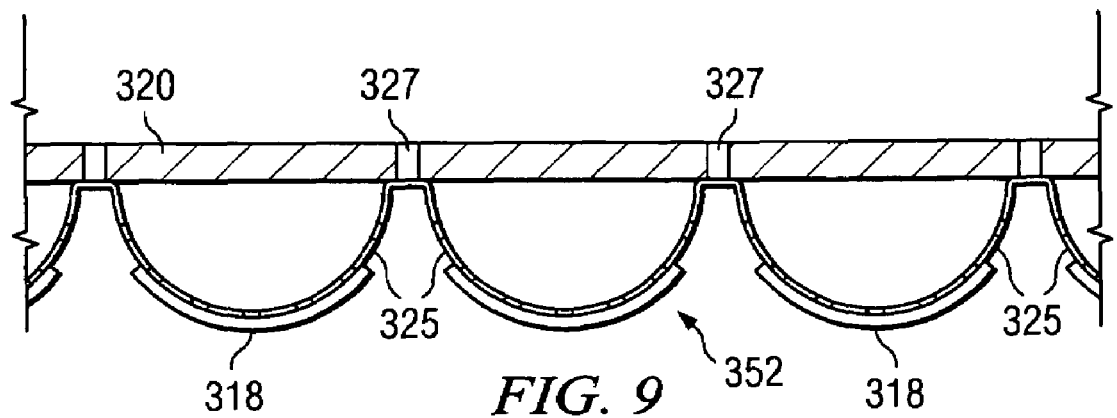
FIG. 9 is a partial cross sectional view of convexly shaped molds disposed on a top conveyor of a form fryer in accordance with the present invention.
Figure 10:
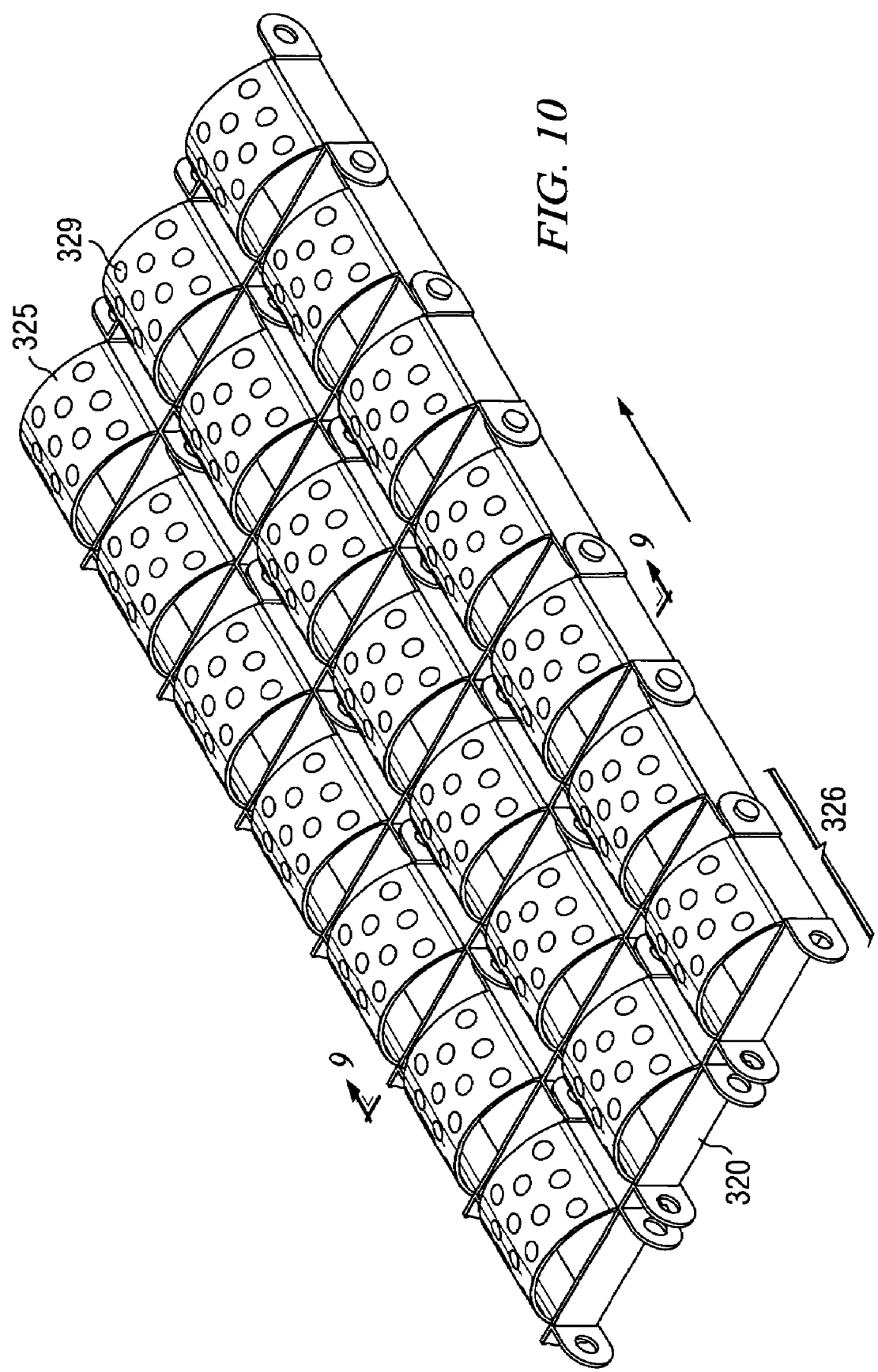
FIG. 10 is a partial top perspective view of molds disposed on the top conveyor of FIG. 9.

FIGS. 9 and 10 show a plurality of molds 325 disposed upon a top conveyor 320. FIG. 9 shows a cross sectional transverse view of these molds upon a top conveyor 320. Upward forces from the cooking oil 352 support the cooking snack pieces 318 in position against the surfaces of a plurality of molds 325. These molds 325 are retained by a plurality of supports 327 to the top conveyor 320. The top conveyor 320 and molds 325 may comprise an oil-pervious, chain-link structure of a durable material such as stainless steel or another type of metal, a ceramic, or a polymer-based material capable of withstanding exposure to hot oil. Alternatively, the top conveyor 320 may also comprise any food-grade, perforated, durable, but flexible material able to withstand frying oil temperatures. Further, each mold 325 is formed with a plurality of holes or channels to allow steam and other gases to rise and pass through or by to escape from the cooking oil 352. This is provided to remove gases released from cooking which would otherwise collect and dislodge snack pieces. FIG. 10 shows a perspective view of the molds 325 of FIG. 9. Here, a plurality of holes 329 is shown. In the preferred embodiment, these holes are drilled along axes normal to the top conveyor 320 rather than axes normal to the surface of the molds 325. Drilling holes in this manner helps prevent product from undesirably sticking to the mold surfaces when portions of pre-form material rise into the holes 329. FIG. 10 also shows transverse mold segments 326 hinged together in a chain-like manner. This allows the top conveyor 320 to have firm convex surfaces for molding food pieces while also being able to follow arcuate paths around rollers. Further, the molds 325 are arranged to form uniformly shaped snack pieces that may be stacked into a canister type container.

Figure 11:
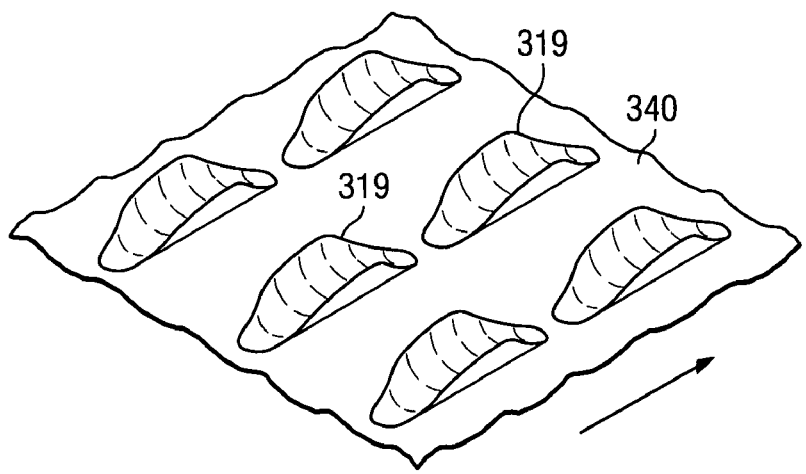
FIG. 11 is a partial top perspective view of concavely shaped snack pieces being conveyed on a bottom exit conveyor formed by the molds of FIGS. 9 and 10.

A plurality of fully cooked snack pieces 319 is shown in FIG. 11. The snack pieces 319 are conveyed on an exit conveyor 340 as they are directed on to seasoning and packaging. As the snack pieces 319 were formed from convex molds 325, the snack pieces 319 are concavely shaped with their concave sides up. As shown, the shape comprises an ellipse wherein the longitudinal edges of each cooked snack piece 319 are curved upward from the surface of the exit conveyor 340. While a generally elliptical shape is shown, other shapes are possible such as squares, circles, or triangles depending on the shape of the pre-forms.

Figure 12:
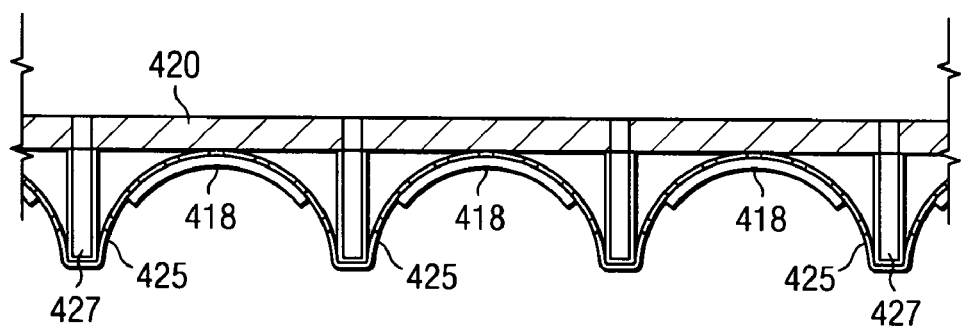
FIG. 12 is a partial cross sectional view of concavely shaped molds disposed on a top conveyor of a form fryer in accordance with the present invention.
Figure 13:
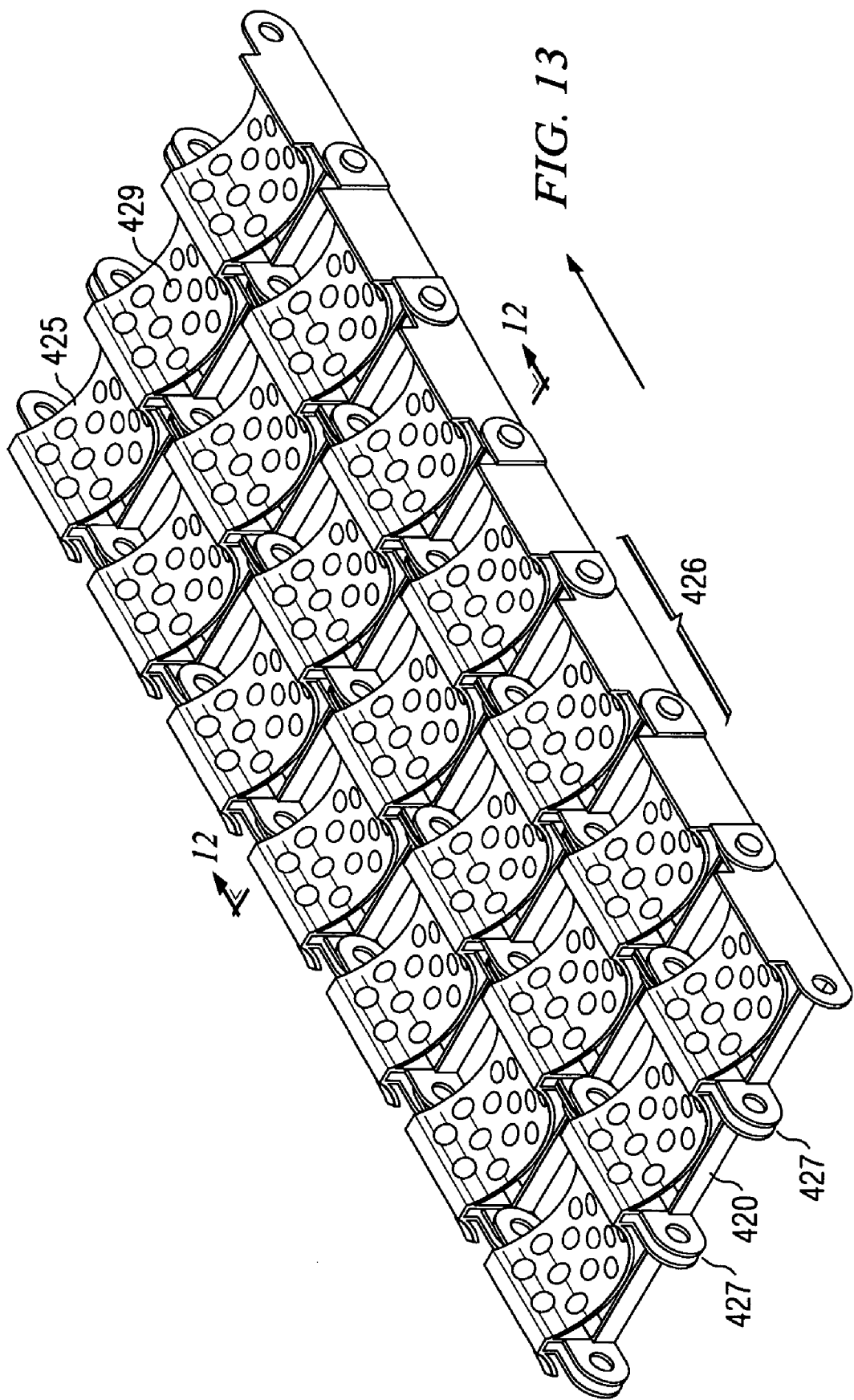
FIG. 13 is a partial top perspective view of molds disposed on the top conveyor of FIG. 12.

FIGS. 12 and 13 show an alternative arrangement of molds as compared to the molds of FIGS. 9 and 10. In FIG. 12, a cross sectional transverse view of a top conveyor 420 having a plurality of molds 425 is shown wherein the molds 425 are concave relative to a plurality of snack pieces 418. Aside from the shape, the concave molds 425 in FIG. 12 are of similar construction as the convex molds 325 in FIG. 11. The concave molds 425 in FIG. 12 are held to the top conveyor 420 with a plurality of supports 427. With this design, the cooking snack pieces 418 form a convex shape with the convex side down. Like FIG. 10, FIG. 13 shows a plurality of transverse mold segments 426 hinged together in a chain-like manner. This allows the top conveyor 420 to have firm concave surfaces, concave relative to the cooking product, on a plurality of individual molds 425 for molding food pieces while also being able to follow arcuate paths around rollers. The molds 425 are attached to the top conveyor 420 by a plurality of supports 427 and have a plurality of holes 429 with the same properties as the holes described in FIG. 10.

Figure 14:
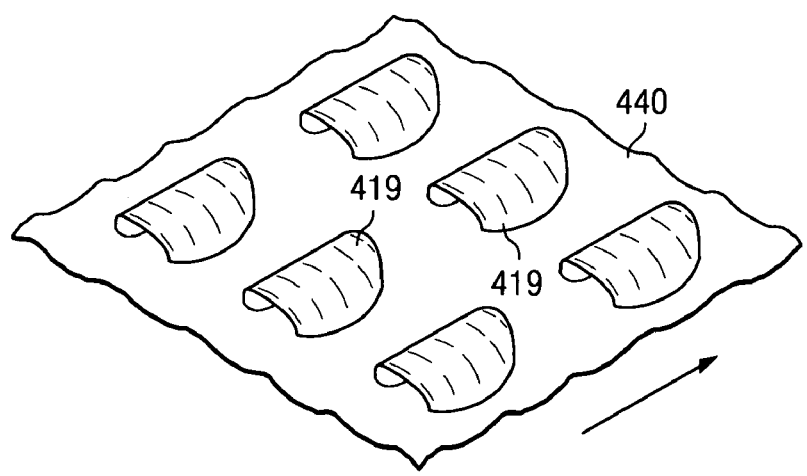
FIG. 14 is a partial top perspective view of convexly shaped snack pieces being conveyed on a bottom exit conveyor formed by the molds of FIGS. 12 and 13.

The convex shapes of a plurality of fully cooked snack pieces 419 are shown in FIG. 14 as they are conveyed upon an exit conveyor 440. These snack pieces 419 are uniformly shaped so that they may be stacked. Once stacked, the snack pieces are ready for packaging. Because the snack pieces 419 are formed with a convex shape, there is no need to flip the snack pieces prior to stacking and packaging. This provides economic savings as a flipping device is not required. As shown, the shape comprises an ellipse wherein the longitudinal edges of each cooked snack piece 419 are curved downward toward the surface of the exit conveyor 440. While a generally elliptical shape is shown, other shapes are possible such as squares, circles, or triangles depending on the shape of the pre-forms.

While FIGS. 9–14 illustrate the use of uniformly shaped molds for producing stackable, uniformly shaped product pieces, many different mold shapes can be used, and even combined with one another, if randomly shaped, non-stackable end products are instead desired. For example, the cross-sectional views of alternative molds might resemble various segments of a sinusoidal curve.

Figure 15:
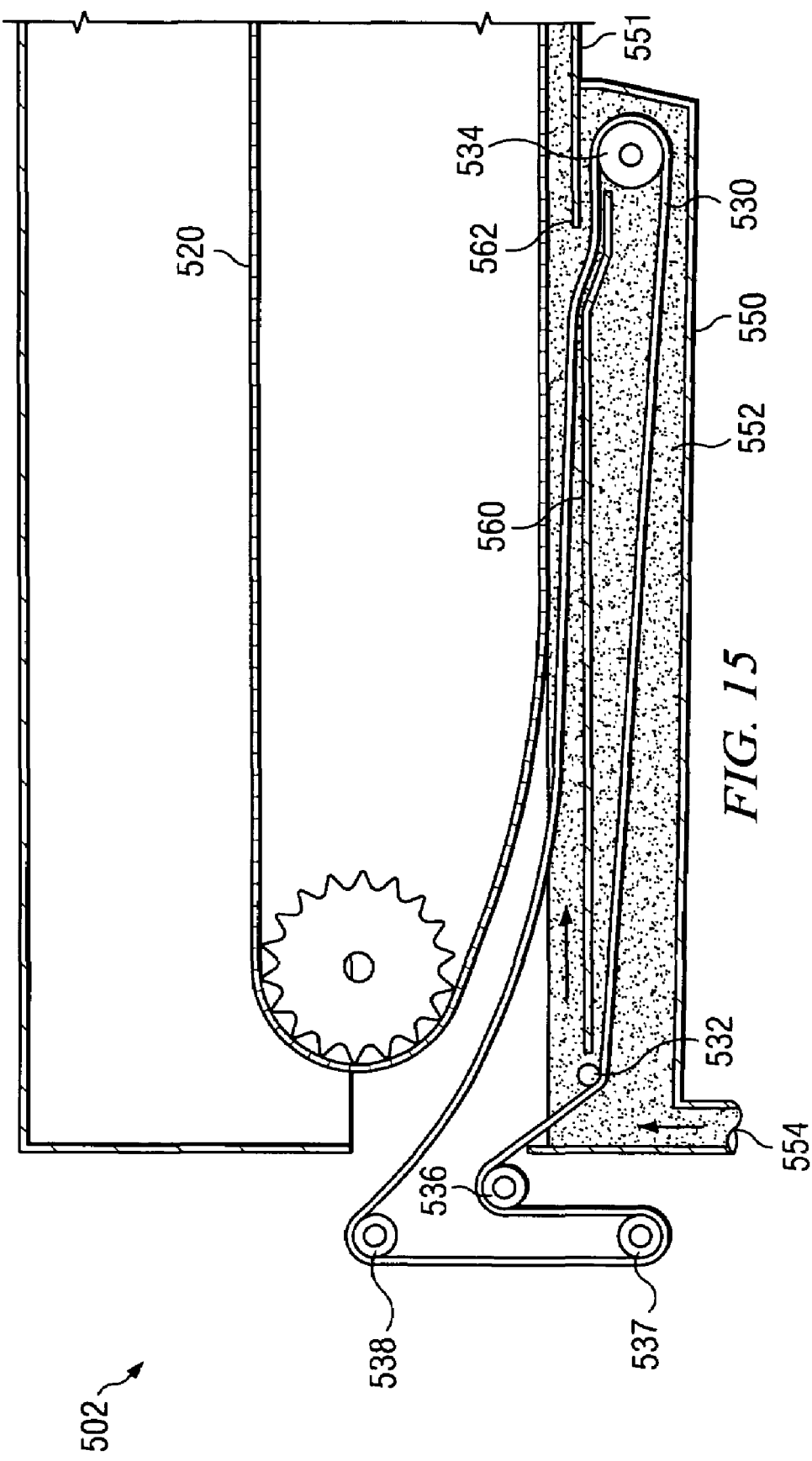
FIG. 15 is a schematic cross sectional view of a form fryer entrance section in accordance with the present invention showing oil pan extensions.
Figure 16:
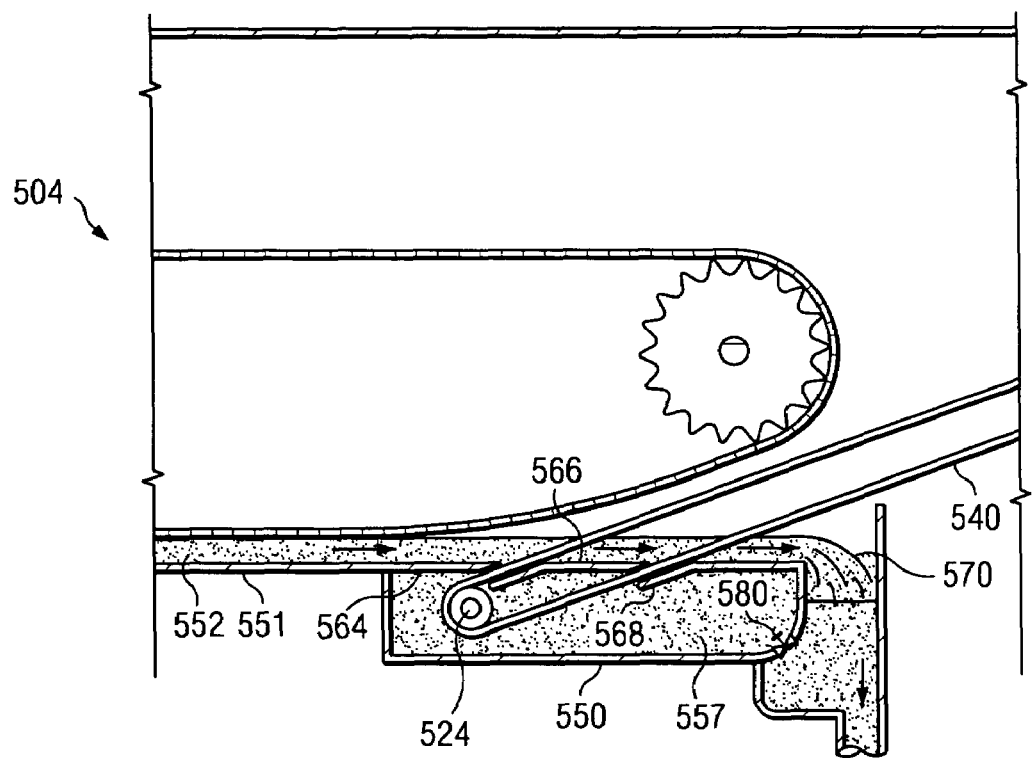
FIG. 16 is schematic cross sectional view of form fryer exit section in accordance with the present invention showing oil pan extensions.

FIGS. 15 and 16 show an entrance section 502 and an exit section 504 of a fryer utilizing several oil pan extensions 560, 562, 564, 566, 568 to isolate the cooking product from fluctuations in oil velocity due to changes in the cross-sectional area of the fryer's oil pan 550. The cross-sectional area of the oil pan 550 changes because, although the width remains constant, the depth varies. In FIG. 15, the oil pan entrance area 550 must be deep enough to accommodate the bottom entrance conveyor 530, whereas the reduced volume segment 551 does not have to accommodate the bottom entrance conveyor 530. Likewise, in FIG. 16, the depth of the oil pan 550 after the reduced volume segment 551 must increase to accommodate the bottom exit conveyor 540.

When the volumetric oil flow rate is fixed, the oil velocity is inversely proportional to the cross-sectional area through which the oil flows. In FIG. 3, for example, oil 252 flowing from an oil inlet 254 to a reduced volume segment 251 encounters a reduction in cross-sectional area as it enters the reduced volume segment 251. This reduction in cross-sectional area causes the velocity of the oil 252 to increase in the reduced volume segment 251. Consequently, there is a difference in the oil velocity over different areas of the oil pan 250 while the velocity of the top conveyor 220 remains constant. These velocity fluctuations can undesirably disturb the product and even prematurely dislodge the product from the molds of the top conveyor 220. In the preferred embodiment, the oil 252 flows with an oil velocity equal to or slightly less than the velocity of the top conveyor 220. As noted in the discussion of FIG. 2, the oil velocity can be designed to be slightly less than the top conveyor velocity and slightly greater than the entrance conveyor velocity in order to effect a positive transfer.

Without the use of pan extensions, the product must past through three different oil velocity zones: a slow oil pan entrance area, a quick reduced volume segment, and a slow oil pan exit area. However, returning to FIGS. 15 and 16, a plurality of pan extensions 560, 562, 564, 566, 568 can be used to prevent oil velocity fluctuations around the product. For example, in FIG. 15, a first input-side pan extension 560 can be positioned within the oil pan, in the oil, and between the feeding and post-feeding segments of the bottom entrance conveyor. A second input-side pan extension 562 can similarly be positioned between the bottom entrance conveyor 530 and the reduced volume segment 551. In FIG. 16, a first output-side extension can be placed within the oil pan 550, in the oil 552, and between the reduced volume segment 551 and the receiving segment of the bottom exit conveyor 540. A second output-side extension can be placed between the receiving and pre-receiving segments of the bottom exit conveyor 540. Likewise, a third output-side extension can be placed between the pre-receiving segment of the bottom exit conveyor 540 and the downstream end of the oil pan 550.

With the pan extensions of FIGS. 15 and 16, the reduced-volume-segment velocity zone is effectively extended to begin before the product enters the oil and end after the product leaves the oil. Because all of the pan extensions are essentially level in the horizontal plane with the bottom of the reduced volume segment 551 of the oil pan 550, the cross-sectional area of the oil pathway remains constant. The oil velocity therefore remains constant as it flows from an oil inlet 554, over the various pan extensions, and through the reduced volume segment 551. The upstream pan extension 560 in FIG. 15 should extend some distance before the point where product enters the oil in order to give the oil time to adjust to the decrease in cross-sectional area. Likewise, the furthest downstream pan extension 568 in FIG. 16 should extend some distance beyond the point where cooked product exits the oil in order to isolate the product from any disturbance due to the increase in cross-sectional area at the end of the furthest downstream pan extension 568. Note, however, that the vertical positions of the various pan extensions can be altered slightly to compensate for changes in the volume of oil that passes over the pan extensions and through the reduced volume segment 551. For example, the vertical level of each pan can increase slightly from one to the next to compensate for the absorption of oil by the product.

In FIG. 15, the downstream edge of upstream oil pan extension 560, as well as the upstream edge of the downstream oil pan extension 562, should extend as close as possible to the bottom entrance conveyor 530. This ensures that the velocity zone above the oil pan extensions 560, 562 is separated as much as possible from the velocity zone below those pan extensions. Similarly, in FIG. 16, the upstream, midstream, and downstream pan extensions 564, 566, 568 should extend as close as possible to the bottom exit conveyor 540 in order to keep separate the oil velocity zones above and below those pan extensions.

Referring back to FIG. 15, the cross-sectional area of the oil pathway over the upstream oil pan extension 560 temporarily and slightly decreases as oil 552 passes through the bottom entrance conveyor 530. The oil 552 thus temporarily increases in velocity while it passes through the bottom entrance conveyor 530. Whereas an oil velocity disturbance further downstream would be undesirable once the preforms begin to cook against the top conveyor 520, this particular oil velocity increase is desirable. The slight increase in oil velocity helps the pre-forms dislodge from the bottom entrance conveyor 530 so that they can meet with the molds of top conveyor 520.

While FIG. 15 shows the use of pan extensions with one particular bottom entrance conveyor pathway as defined by a bottom entrance conveyor 530 and a plurality of rollers 532, 534, 536, 537, 538, other pathways may be used including, but not limited to, the pathways shown in FIGS. 3–7. Likewise, embodiments of fryer exit areas utilizing pan extensions are not limited to the specific arrangement of elements shown in FIG. 16. For example, FIG. 16 depicts one particular arrangement of elements in an exit area 504 wherein oil flows through the reduced volume section 551, over the furthest downstream pan extension 568, and down into a separate oil collection area 570 before exiting at an oil outlet 556. A valve 580 between the oil collection area and the body of oil under the exit-area pan extensions 564, 566, 568 can be modulated so that only a small fraction of the oil passing over those pan extensions passes between the pans, into a fairly stagnant area 557 containing a submerged roller 524 for the bottom exit conveyor 540, and through the valve 580. Alternatively, the oil 552 does not have to flow into a separate collection area 570. The oil might instead flow over and past the furthest downstream pan extension 568 to join with the rest of the oil 552 contained within the oil pan 550 and under the exit-area pan extensions 564, 566, 568.

Figure 17A:
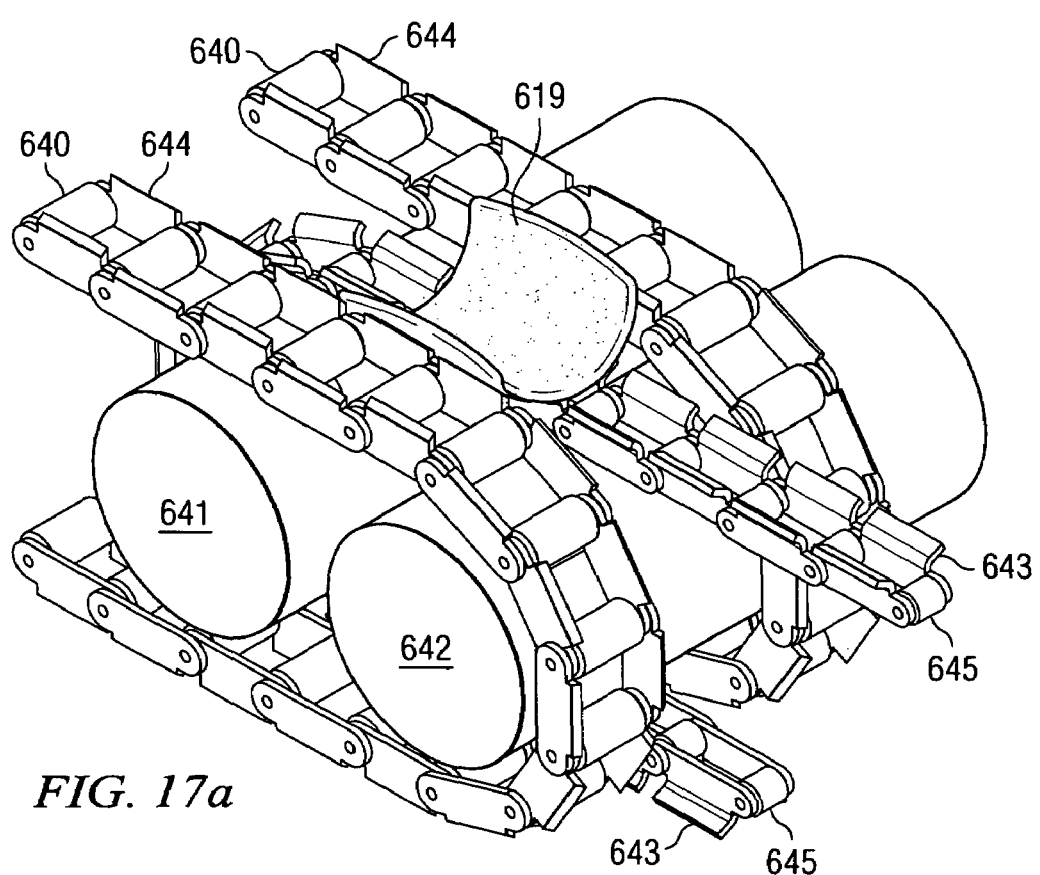
FIG. 17a is a top perspective view of concavely shaped snack pieces being conveyed along a pair of interlaced conveyors in accordance with the present invention.
Figure 17B:
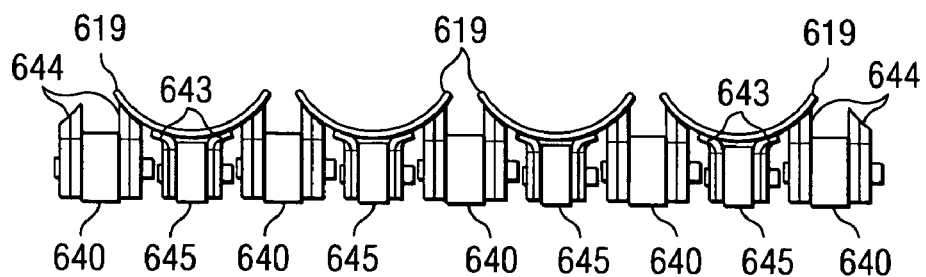

FIGS. 17*a* and 17*b* illustrate the transition point between two conveyors 640, 645. They also show how a plurality of cooked product pieces 619 are conveyed smoothly from a bottom exit conveyor 645 to an intermediate transport conveyor 640 after the product pieces are removed from the fryer. FIG. 17*a* is a perspective view of only one lane of two successive, multi-lane, interlaced conveyors 640, 645, with each lane of one conveyor passing over the guiding roller 641, 642 of the other. FIG. 17*b* is a cross-sectional view of several lanes of two successive, multi-lane, interlaced conveyors. Now referring to FIGS. 17*a* and 17*b* simultaneously, by interlacing the discretely spaced lanes of two successive conveyors 640, 645, the product pieces 619 are under the positive control of at least one conveyor at all times. Suppose, for example, that product is transferred from the bottom exit conveyor 645 to the intermediate transport conveyor 640 in FIG. 17*a*. While on the exit conveyor 645, each piece is carried by seats 643, which support each product piece at its midsection. Once the product 619 reaches the interlaced portion of the conveyors 640, 645, each product piece is simultaneously supported at its midsection by seats 643, disposed upon conveyor 645, and near its edges by supporting panels 644, disposed upon conveyor 640. As product 619 continues past the interlaced portion of the conveyors 640, 645, the product pieces are no longer supported by seats 643 but are instead supported near its edges by supporting panels 644 upon the intermediate transport conveyor 640. Product can be transferred smoothly from conveyor to conveyor in this manner, with product support areas alternating between product midsections and product edges. Alternatively, product can be transferred in the opposite direction, from the product-edge-supporting conveyor to the product-midsection-supporting conveyor. In addition, the bottom exit conveyor can be designed to carry product out of the fryer by supporting the product near its edges rather than at its midsection. In such a case, the product can then be transferred to an intermediate conveyor that supports the product at its midsection.

Figure 18:
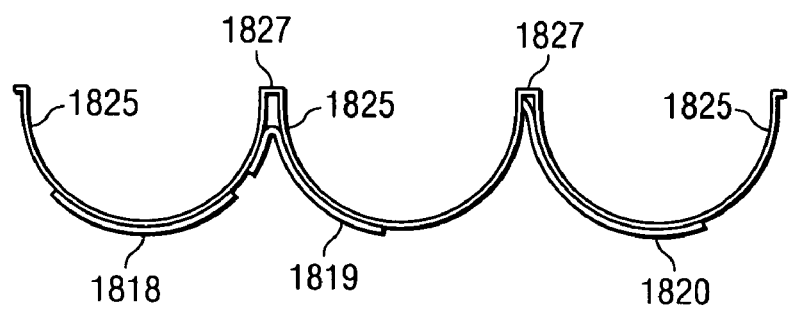
FIG. 18 is a partial cross sectional view of convexly shaped molds disposed on a top conveyor of a form fryer and having several dough pieces lying against their lower surfaces.

FIG. 18 is a partial cross sectional view of convexly shaped molds 1825 disposed on a top conveyor of a form fryer and having several dough pieces 1818, 1819, 1820 lying against their lower surfaces. The left-most dough piece 1818 is shown in the preferably centered position against the bottom surface of the left-most convex mold 1825. Ideally, upon entering the cooking oil, each dough piece should come to rest up against the bottom surface of its respective top conveyor mold such that the longitudinal centerline of such dough piece should be aligned with the longitudinal centerline of the conveyor mold. This orientation allows the frying dough piece to retain a curved, longitudinally symmetrical shape. Where dough pieces are shaped by frying up against convexly-shaped fryer molds, such as is shown in FIG. 18, frying may impart a net upward force upon the dough pieces. A net upward force may be caused by one or more factors such as evolving steam and other gases, a decrease in density of the frying product, and the relative velocity vectors of the molds and the cooking oil. Such an upward force, however, may cause a dough piece to shift from side to side and away from the intended centered position against the mold surface. Left untreated, dough pieces may come to rest against the mold surfaces 1825 in potentially undesirable positions such as those of the middle 1819 and right dough 1820 pieces shown in FIG. 18. Frying in off-center positions can result in flattened or bent edges 1820, or even result in wing-tipped or curled-edged product pieces 1819. The defects will depend upon the extent to which, and the manner in which, the product pieces move away from the center and towards the joining area 1827 between each of the molds. Although such shapes may be desirable in some instances, they are generally not desirable in applications where a consistent shape is required for precise stacking of product pieces. Off-centered product pieces may also leave the fryer with improper positioning for stacking. Furthermore, dough pieces that shift and move into the joining area 1827 can lodge between molds and jam the conveyor and/or fryer.

Figure 19:
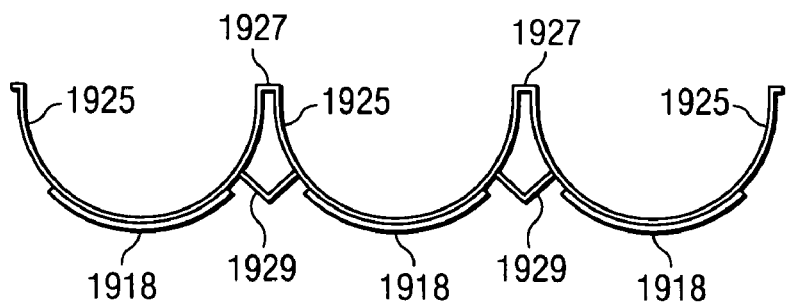
FIG. 19 is a partial cross sectional view of several dough pieces lying against the lower surfaces of convexly shaped molds having product-centering elements attached between molds.

FIG. 19 is a partial cross sectional view of several dough pieces 1918 lying against the lower surfaces of convexly shaped molds 1925 having product-centering elements 1929 that flank the lateral sides of each mold. In a preferred embodiment, product-centering elements (clips, guides, rods, or the like) such as those shown 1929 in FIG. 19, are positioned between any convexly shaped molds 1925, thereby keeping the dough pieces 1918 relatively centered and preventing the dough pieces from lodging within the joining area 1927 between adjacent molds 1925. Centering elements can also be positioned at the outward-facing sides of the first and last molds on any given row of molds along the mold conveyor, although such elements may not necessarily have the same shape as the centering elements 1929 between adjacent molds within a given row. In general, each product-centering element (or guide) 1929 should meet the product-retaining surfaces of two adjacent molds 1925 a short distance beyond the ends of where dough pieces 1918 would ideally rest if properly centered. When viewing the top conveyor with the convex molds 1925 facing down, the centering elements 1929 should be aligned directly below the joining areas 1927. In essence, the centering elements 1929 substantially cover each joining area 1927. The "tolerance," or surface distance of the product-centering elements 1929 from the ends of centered dough pieces 1918, should be large enough to accommodate typical variations in initial product placement upon the mold surfaces, yet small enough to prevent undesirable shape defects, product-jamming, or stacking problems caused by migration from the centerline. The area of each mold 1925 where a dough piece will rest if properly centered can be called the "product-retaining portion" or "desired setting area." Thus the tolerance can also be defined as the surface distance between the product-retaining portion (or "desired setting area") and the centering elements 1929 which flank its sides. In a preferred embodiment, the product-centering elements 1929 comprise V-shaped elements (or guides or troughs). The angle formed between the product-retaining portion of any given mold 1925 and centering element 1929 should preferably be at least ninety degrees to minimize the risk of any dough piece lodging or jamming at the intersection of the mold 1925 and the element 1929. The product-centering elements 1929 can comprise any food-grade material capable of withstanding the mechanical and chemical stresses of frying, such as stainless steel, an alloy, or other metal suitable for frying conditions. They can be welded, snapped, fitted, or attached into place with methods known in the prior art, or they can be manufactured as part of the molds.

In another embodiment, the product-centering guides 1929 have a cylindrical shape and are large enough to prevent dough pieces from sliding off of the intended mold surfaces 1925 and into the joining areas 1927 of the molds 1927. For example, another embodiment of the product-centering elements 1929 can comprise welding rod segments. Note that the exemplified embodiments of product-centering elements disclosed herein are not exclusive, and other embodiments are possible.

FIG. 20 is a partial top perspective view of molds 2025 disposed on a top conveyor similar to that shown in FIG. 9 and having product-centering elements 2029 secured between adjacent molds 2025 in accordance with one embodiment of the present invention. Like the molds shown in FIG. 9, the molds shown in FIG. 20 are perforated 2031 to allow passage of cooking oil and evolving gases. In this particular embodiment, the product-centering elements 2029 are V-shaped guides secured between adjacent molds 2025 in each segment (or row) 2026 of the top conveyor. The centering elements 2029 cover the joining areas 2027 between adjacent molds 2025 so as to prevent frying dough pieces from moving off center and lodging in the joining areas 2027. While the centering elements 2029 are shown having a particular angle and connection point with the molds in FIG. 20, the shape of the product-centering elements and their placement can vary depending on the specific application.

In other embodiments of the invention, the product-centering elements may or may not be shared between adjacent molds. Thus, while the centering elements shown in FIGS. 18 through 20 each serve two adjacent molds, circumstances may require each mold to have its own two product-centering elements that are not shared by those of adjacent molds. In such cases, each centering element may comprise a fin, flap, or rod rather than a V-shaped clip or trough.

With the use of form fryer assemblies made in accordance with the invention, equipment, heating, maintenance, oil, and other expenses are reduced because of the reduced volume of the fryer oil pan. By eliminating a continuous bottom conveyor within the fryer, a reduced fryer oil pan volume is possible and will not affect the quality of the snack pieces produced. Less supports and enclosures are needed in the fryer oil of the present invention as compared to prior art continuous conveyors as the bottom conveyors are not continuously running throughout the length of the fryer oil pan. With less equipment running through the fryer, oil oxidation can be reduced. In addition, productivity increases as there is less equipment that could potentially breakdown.

By eliminating a continuous bottom conveyor throughout the fryer and replacing it with separate bottom entrance and bottom exit conveyors, the frying process benefits from the ability to tailor each bottom conveyor to the differing pre- and post-cooking conditions. The bottom entrance and bottom exit conveyors can have differing shapes, comprise different materials, and rotate with differing speeds depending on what is appropriate for their functions, locations, and operating conditions. For example, in one embodiment of the fryer, the bottom entrance conveyor comprises a flat, perforated, polymeric sheet for receiving flat pre-forms, whereas the bottom exit conveyor comprises several lanes of chains with curved seats for receiving curved, cooked product.

In one embodiment of the invention, the top conveyor mold surfaces are convex relative to the snack pieces below. The molds are preferably equipped with product-centering elements for keeping the snack pieces aligned and centered against their respective mold surfaces.

In a further embodiment of the invention, the fryer employs concavely-shaped molds with the concave sides facing the product. These concavely shaped molds produce convexly-shaped snack pieces with their concave sides facing down, eliminating the need to flip the snack pieces prior to stacking them for packaging.

While the invention has been particularly shown and described with reference to a preferred embodiment, it will be understood by those skilled in the art that various changes in form and detail may be made therein without departing from the spirit and scope of the invention.

What is claimed is:

1. A fryer for molding and cooking a plurality of food pieces, comprising:
   a top conveyor having a plurality of molds linked together and having convex mold surfaces, wherein each mold has a product-retaining portion that is flanked by two product-centering elements;
   a fryer oil pan disposed beneath said top conveyor, said oil pan having a reduced volume segment;
   a body of oil contained within said fryer oil pan;
   a bottom entrance conveyor for delivering, prior to the reduced volume segment of said oil pan, said plurality of food pieces to said body of oil, wherein said bottom entrance conveyor further comprises a feeding segment and a post-feeding segment; and
   a bottom exit conveyor for receiving, after the reduced volume segment of the oil pan, said food pieces from said body of oil, wherein said bottom exit conveyor further comprises a receiving segment and a pre-receiving segment.

2. The fryer of claim 1 wherein each one of said product-centering elements comprises a V-shaped structure, the apex of which points outward from the mold conveyor.

3. The fryer of claim 1 wherein, for each one of said plurality of molds, an angle of at least ninety degrees exists between the convex product-retaining portion and each one of said product-centering elements.

* * * * *